US012742721B2

United States Patent
Freedman et al.

(10) Patent No.: US 12,742,721 B2
(45) Date of Patent: Sep. 22, 2026

(54) METHODS AND SYSTEMS FOR ENHANCED INTERFEROMETRIC DETECTION AND CHARACTERIZATION OF SINGLE PARTICLES VIA THREE-DIMENSIONAL IMAGE REGISTRATION

(71) Applicant: Unchained Labs, LLC, Pleasanton, CA (US)

(72) Inventors: David S. Freedman, Newton Highlands, MA (US); George G. Daaboul, Watertown, MA (US); Steven M. Scherr, Pleasanton, CA (US); Chetan Sood, Pleasanton, CA (US); Leif Stefan Anderson, Pleasanton, CA (US); Dennis Alexander Zimmermann, Pleasanton, CA (US); Mubtasim Akhyar, Pleasanton, CA (US); Gregg Lithgow, Pleasanton, CA (US)

(73) Assignee: Unchained Labs, LLC, Pleasanton, CA (US)

( * ) Notice: Subject to any disclaimer, the term of this patent is extended or adjusted under 35 U.S.C. 154(b) by 223 days.

(21) Appl. No.: 18/785,215

(22) Filed: Jul. 26, 2024

(65) Prior Publication Data

US 2025/0027867 A1 Jan. 23, 2025

Related U.S. Application Data

(63) Continuation of application No. PCT/US2023/061490, filed on Jan. 27, 2023.

(Continued)

(51) Int. Cl.

*G06K 9/00* (2022.01)
*G01N 15/01* (2024.01)

(Continued)

(52) U.S. Cl.

CPC ......... *G01N 15/1433* (2024.01); *G01N 15/01* (2024.01); *G06T 5/50* (2013.01);

(Continued)

(58) Field of Classification Search

CPC ............... G01N 15/1433; G01N 15/01; G01N 2015/1454; G01N 15/1459;

(Continued)

(56) References Cited

U.S. PATENT DOCUMENTS 7,079,251 B2 7/2006 Millerd et al.
7,570,386 B2 * 8/2009 Heink .................... H04N 1/047 358/401

(Continued)

FOREIGN PATENT DOCUMENTS

CN 104568850 A * 4/2015
CN 104730038 A * 6/2015

(Continued)

OTHER PUBLICATIONS

EP Application No. 23747902.7, Extended European Search Report mailed Dec. 19, 2025; Applicant Unchained Labs, LLC.; 6 pages.

(Continued)

*Primary Examiner* — Xin Jia
(74) *Attorney, Agent, or Firm* — COOLEY LLP

(57) ABSTRACT

Presented herein are systems and methods for analyzing images of target particles that are bound to a surface of a substrate. In certain embodiments, systems and method described herein utilize techniques that remove background noise from interferometric images of small particles, allowing for increased accuracy in detection and/or characterization of individual particles. Such techniques, as described herein, may allow individual particles having sizes below about 100 nm (e.g., below about 50 nm; e.g., down to 20 nm) to be accurately detected within images, and, among other (Continued)

things, their characteristic sizes measured utilizing, e.g., their contrast.

23 Claims, 14 Drawing Sheets

Related U.S. Application Data

(60) Provisional application No. 63/345,200, filed on May 24, 2022, provisional application No. 63/303,888, filed on Jan. 27, 2022.

(51) Int. Cl.
*G01N 15/1433* (2024.01)
*G06T 5/50* (2006.01)
*G06T 5/70* (2024.01)
*G06T 7/00* (2017.01)
*G06T 7/33* (2017.01)
*G01N 15/1434* (2024.01)

(52) U.S. Cl.
CPC .............. *G06T 5/70* (2024.01); *G06T 7/0014* (2013.01); *G06T 7/337* (2017.01); *G01N 2015/1454* (2013.01); *G06T 2200/04* (2013.01); *G06T 2207/10064* (2013.01); *G06T 2207/30024* (2013.01); *G06T 2207/30242* (2013.01)

(58) Field of Classification Search
CPC .... G01N 2015/1006; G01N 2015/1445; G06T 5/50; G06T 5/70; G06T 7/0014; G06T 7/337; G06T 2200/04; G06T 2207/10064; G06T 2207/30024; G06T 2207/30242; G06T 2207/10056; G06T 7/33; G06T 2207/10016; G06T 2207/20224; G06T 7/0012; G02B 21/367
See application file for complete search history.

(56) References Cited

U.S. PATENT DOCUMENTS

2007/0212257 A1* 9/2007 Nolte .................. G01N 21/253
422/400
2014/0099011 A1 4/2014 Begin

FOREIGN PATENT DOCUMENTS

| | | | |
|---|---|---|---|
| CN | 110389140 | A | 10/2019 |
| WO | WO-2017136676 | A1 | 8/2017 |
| WO | WO-2019232321 | A1 | 12/2019 |
| WO | WO-2020160402 | A1 | 8/2020 |
| WO | WO-2023147499 | A2 | 8/2023 |

OTHER PUBLICATIONS

Piliarik Marek et al., “Direct Optical Sensing of Single Unlabeled Small Proteins and Super-resolution Microscopy of Their Binding Sites” arXiv.org, Oct. 29, 2013, [Retrieved from the Internet: URL:https://arxiv.org/pdf/1310.7460, retrieved on Dec. 12, 2025]; 15 pages.

International Search Report and Written Opinion for PCT Application No. PCT/US2023/061490 mailed on Jul. 18, 2023, 9 pages.

* cited by examiner

Subtraction After XY Shift

METHODS AND SYSTEMS FOR ENHANCED INTERFEROMETRIC DETECTION AND CHARACTERIZATION OF SINGLE PARTICLES VIA THREE-DIMENSIONAL IMAGE REGISTRATION

CROSS-REFERENCE TO RELATED APPLICATIONS

This application is a continuation of International Application No. PCT/US2023/061490, filed on Jan. 27, 2023, which claims priority to U.S. Provisional Application No. 63/303,888, filed on Jan. 27, 2022, and U.S. Provisional Application No. 63/345,200, filed on May 24, 2022, each of which is hereby incorporated by reference in its entirety.

FIELD

This application relates generally to methods and systems for analyzing images. In certain embodiments, the images are interferometric scattering-based images of small particles. The small particles may be extracellular vesicles, exosomes, viruses, virus-like particles, or lipid nanoparticles. Detection of the small particles in the images may be used to classify, diagnose, and/or monitor a disease in a patient, or select a treatment option for the patient.

BACKGROUND

The ability to detect biological target molecules is fundamental to our understanding of both cell physiology and disease progression, as well as for use in various applications such as early and rapid evaluation of disease, and disease diagnosis.

Accordingly, there is a need for systems and methods that provide for detection and characterization of biological molecules, in particular improved detection of small biological particles.

SUMMARY

Described herein are systems and methods for analyzing images of particles (e.g., the small particles and target particles described herein) that are bound to a surface of a substrate. In certain embodiments, the systems and methods may utilize techniques that remove background noise from interferometric images of the particles, which may increase the accuracy in detection and/or characterization of individual particles. Such techniques, which may include affine transformation, may allow individual particles having sizes below about 100 nm (e.g., below about 75 nm, below about 50 nm, below about 25 nm, down to about 20 nm, including all values and sub-ranges therein) to be accurately detected within images. Put another way, the size of the individual particles that may be detected may range from about 20 nm to about 100 nm, including all values and sub-ranges therein. For example, the size of the individual particles may be about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, or about 100 nm. The individual particle sizes may be measured utilizing, e.g., their contrast.

In certain embodiments, the systems and methods described herein utilize prescan images of a region of a sensor surface before a sample is contacted with it to remove background from postscan images that are taken of the same region or a substantially same region (e.g., a region within about ±5 microns in the X and Y direction, within about 100 nm in the Z direction, and/or within about ±2 degrees of rotation) after the sensor is contacted with a sample. In this manner, features in the postscan image that are unchanged, like background fluctuations and substrate roughness and imperfections, may be removed, leaving only features of interest that represent target particles within the sample that have been captured at the sensor surface. The images may be taken using an imaging system including an interferometric biosensor, e.g., a SP-IRIS (Single Particle Interferometric Reflectance Imaging Sensor).

Examples of samples that may be placed on the sensor surface and imaged, include without limitation, cells, organisms, lysed cells, cellular extracts, nuclear extracts, components of cells or organisms, extracellular fluid, media in which cells are cultured, blood, plasma, serum, gastrointestinal secretions, homogenates of tissues or tumors, synovial fluid, feces, saliva, sputum, cyst fluid, amniotic fluid, cerebrospinal fluid, peritoneal fluid, lung lavage fluid, semen, lymphatic fluid, tears and prostatic fluid. In addition, a sample may be a viral or bacterial sample, a sample obtained from an environmental source, such as a body of polluted water, an air sample, or a soil sample, as well as a food industry sample. Target particles that may be detected by the imaging include, but are not limited to, extracellular vesicles, exosomes, viruses, virus-like particles, or lipid nanoparticles.

In certain embodiments, approaches of the present disclosure utilize a three dimensional registration approach that may allow prescan images to be accurately registered with postscan images. This approach not only accounts for translations, rotations, etc., in a transverse plane (e.g., parallel to the sensor surface), but also leverages stacks of images collected at different axial distances (e.g., between a sensor surface and an objective of the imaging system) to accurately identify and match prescan and postscan focal planes. In certain embodiments, reference particles are disposed about the sensor surface, to provide features that can be detected in images and an axial position is varied, and used to identify focal planes.

In this manner, the systems and methods described herein may remove background features that would otherwise reduce the ability to detect nanoscale particles (e.g., particles having a size below 50 nm) in interferometric scattering images, thereby opening the door for imaging applications to particles that were previously impractically small, such as extracellular vesicles having sizes of 50 nm and below (e.g., exomeres and supermeres), viral vectors for gene delivery (e.g., Adeno-associated virus (AAV) vectors), lipid nanoparticles, and the like.

In one aspect, the method for reducing background in interferometric images (e.g., SP-IRIS images) via a three-dimensional (3D) image registration and background correction includes: (a) receiving and/or accessing, by a processor of a computing device, a prescan stack comprising a plurality of images of a first region of a sensor chip surface, the images of the prescan stack having been obtained prior to contacting the sensor chip surface with a sample comprising one or more target particles, and each image of the prescan stack corresponding to an image of the first region of the sensor chip surface taken at a different axial distance from an objective of an imaging system (e.g., a SP-IRIS imaging system); (b) receiving and/or accessing, by the processor, a postscan stack comprising a plurality of images of a second region of the sensor chip surface, where the second region is the same as, or substantially overlapping with the first region (e.g., within about ±5 microns in the X and Y direction, within about 100 nm in the Z direction, and/or within about ±2 degrees of rotation of the first region), the images of the postscan stack having been obtained after contacting the sensor chip surface with the sample (e.g., and thereby capturing at least a portion of the one or more target particles on the sample surface), and each image of the postscan stack corresponding to an image of the second region of the sensor chip surface taken at a different axial distance from the objective of the imaging system (e.g., the SP-IRIS imaging system); (c) determining (e.g., automatically), by the processor, a prescan focal plane position for the prescan stack and using the prescan focal plane position to obtain, from the prescan stack, a focused prescan image (e.g., a particular image of the prescan stack identified as at and/or nearest to the focal plane position); (d) determining (e.g., automatically), by the processor, a postscan focal plane position for the postscan stack and using the postscan focal plane position to obtain, from the postscan stack, a focused postscan image (e.g., a particular image of the postscan stack identified as at and/or nearest to the focal plane position); (e) registering (e.g., automatically), by the processor, the focused prescan image with the focused postscan image; and (f) (e.g., following step (e)) using, by the processor, the focused prescan image and focused postscan image, having been registered with each other, to create one or more final particle image(s) with background removed. In some variations of the method, imaging may be performed in a liquid media.

In certain embodiments, the first region of the sensor chip surface imaged in the prescan stack comprises a plurality of reference particles such that each of at least a portion of the prescan images of the prescan stack comprise one or more reference particle features (e.g., spots), each corresponding to (e.g., representing) an individual reference particle.

In certain embodiments, step (c) comprises: detecting, within each of at least a portion of the images of the prescan stack, a set of one or more reference particle features (e.g., localized regions of relatively high or low contrast with respect to their surrounding area (e.g., bright and/or dark spots) each corresponding to (e.g., representing) an individual reference particle; and using the sets of reference particle features within the images of the prescan stack to determine the prescan focal plane position.

In certain embodiments, the method comprises: (A) determining, for each of at least a portion of images of the prescan stack, one or more focal metrics using the detected set of detected reference particle features for the image, where determining the one or more focal metrics may comprise one or more of: (i) determining a number of reference particle features within each of the portion of prescan images (e.g., counting a number of detected reference particles); (ii) determining a measure (e.g., a statistical measure (e.g., average, mean, median, mode, etc.)) of reference particle contrast for each of the portion of prescan images; and (iii) determining a measure (e.g., a statistical measure (e.g., average, mean, median, mode, etc.)) of reference particle size for each of the portion of prescan images); and (B) using the one or more focal metrics to determine the prescan focal plane position. In some instances, determining the prescan focal plane position further includes determining an axial position within the prescan stack that maximizes a particular focal metric, e.g., by comparing a particular focal metric to a reference value and/or range (e.g., based on a known value of reference particle size).

In certain embodiments, the second region of the sensor chip surface imaged in the postscan stack comprises a plurality of reference particles, where at least a portion of the reference particles of the first and second regions match (e.g., are a same particle), and such that each of at least a portion of the images of the postscan stack comprise one or more reference particle features (e.g., spots), each corresponding to (e.g., representing) an individual reference particle.

In certain embodiments, step (d) comprises: detecting, within each of at least a portion of the images of the postscan stack, a set of one or more reference particle features (e.g., localized regions of relatively high or low contrast with respect to their surrounding area (e.g., bright and/or dark spots) each corresponding to (e.g., representing) an individual reference particle; and using the sets of reference particle features within the images of the postscan stack to determine the postscan focal plane position.

In certain embodiments, the method comprises: (A) determining, for each of at least a portion of images of the postscan stack, one or more focal metrics using the detected set of detected reference particle features for the image, where determining the one or more focal metrics comprises one or more of: (i) determining a number of reference particle features within each of the portion of prescan images (e.g., counting a number of detected reference particles); (ii) determining a measure (e.g., a statistical measure (e.g., average, mean, median, mode, etc.)) of reference particle contrast for each of the portion of prescan images; and (iii) determining a measure (e.g., a statistical measure (e.g., average, mean, median, mode, etc.)) of reference particle size for each of the portion of prescan images; and (B) using the one or more focal metrics to determine the postscan focal plane position. In some instances, determining the postscan focal plane position further includes determining an axial position within the postscan stack that maximizes a particular focal metric, e.g., by comparing a particular focal metric to a reference value and/or range (e.g., based on a known value of reference particle size).

In certain embodiments, the reference particles are spherical or approximately spherical particles having a refractive index ranging from about 1.2 to about 2.0, including all values and sub-ranges therein. For example, the refractive index may be about 1.2, about 1.3, about 1.4, about 1.5, about 1.6, about 1.7, about 1.8, about 1.9, or about 2.0. In some variations, the refractive index may be less than or approximately equal to 2.0. In one variation, the refractive index may be about 1.45. When the reference particles comprise beads, the beads may be one or more members selected from the group consisting of polystyrene beads, silica beads, latex beads, and polystyrene sulfate beads. The reference particles may have a diameter of approximately 2.5 microns or less, approximately 2.25 microns or less, approximately 2.0 microns or less, approximately 1.75 microns or less, approximately 1.5 microns or less, approximately 1.25 microns or less, approximately 1.0 micron or less, approximately 0.75 microns or less, approximately 0.5 microns or less, approximately 0.2 microns or less, or approximately 0.1 microns or less.

In certain embodiments, the first and/or second regions of the sensor chip surface comprise at least a portion (e.g., a same portion) including a spot comprising one or more target binding agents that bind to the target particles (e.g., that bind to one or more markers at a surface of the target particles). In this embodiment, the target particles may be antibodies.

In certain embodiments, the reference particles comprise one or more molecules at their surface to which the one or more target binding agents of the spot also bind.

In certain embodiments, the spot also comprises one or more reference binding agents that bind to the reference particles.

The number of reference particles in the spot may range from about 25 to about 100, including all values and sub-ranges therein. For example, the number of reference particles in the spot may be about 25, about 30, about 40, about 45, about 50, about 55, about 60, about 65, about 70, about 75, about 80, about 85, about 90, about 95, or about 100.

In certain embodiments, step (e) comprises using a set of detected reference particle features within the focused prescan image and a set of detected reference particle features within the focused postscan image (e.g., as fiducial markers) to register the focused prescan image and the focused postscan image with each other.

In certain embodiments, the sensor chip surface comprises fiducial markers and step (e) comprises using the fiducial markers for the image registration. In some variations, the fiducial markers may be reference particles. In other variations, the fiducial markers may be lithographically defined fiducial markers. Other types of fiducial markers may also be employed.

In certain embodiments, step (c) comprises determining a measure of background intensity variation (e.g., a standard deviation) for each of at least a portion of the images of the prescan stack and using the measure of background intensity variation to determine the prescan focal plane position.

In certain embodiments, step (d) comprises determining a measure of background intensity variation (e.g., a standard deviation) for each of at least a portion of the images of the postscan stack and using the measure of background intensity variation to determine the postscan focal plane position.

In certain embodiments, step (f) comprises subtracting the focused prescan image from the focused postscan image (e.g., a pixel-wise subtraction) (e.g., to create the final particle image).

In certain embodiments, the method further comprises detecting, by the processor, within at least a portion (e.g., a particular one; e.g., a subset) of the one or more final particle image(s), one or more target particle features, each corresponding to (e.g., representing) an individual target particle and using the detected one or more target particles to enumerate and/or characterize (e.g., determine a measure of size, weight, etc.) a number of individual target particles bound to the sensor chip surface.

In certain embodiments, the method further comprises receiving and/or accessing, by the processor, a fluorescence image of a third region of the sensor chip surface, the third region substantially overlapping with the second region, and using the fluorescence image and at least a portion (e.g., a particular one; e.g., a subset) of the one or more final particle image(s) to quantify and/or characterize a population of target particles comprising a particular biomarker (e.g., at their surface or within).

In certain embodiments, a size of the target particles is about 50 nm in diameter or below. For example, the size of the target particles may be about 45 nm or below, about 40 nm or below, about 35 nm or below, or about 30 nm and below. In some embodiments, the size of the target particles may be between about 20 nm and about 50 nm, including all values and sub-ranges therein. For example, the size of the target particles may be about 20 nm, about 25 nm, about 30 nm, about 35 nm, about 40 nm, about 45 nm, or about 50 nm.

In certain embodiments, the target particles comprise extracellular vesicles (e.g., exosomes; e.g., exomeres and/or supermeres).

In certain embodiments, the target particles comprise viruses and/or virus-like particles (e.g., lentivirus, e.g., adeno-associated virus (AAV)).

In certain embodiments, the target particles comprise lipid nanoparticles.

In some embodiments, detection of the target particles in the images with background removed may be used to classify, diagnose, and/or monitor a disease in a patient, or select a treatment option for the patient.

In certain embodiments, the method comprises: prior to contacting the sensor chip surface with the sample, imaging the sensor chip surface using the imaging system at a plurality of different axial distances from the objective of the imaging system, thereby obtaining the images of the prescan stack; contacting the sensor chip surface with the sample, thereby capturing at least a portion of the target particles within the sample at the sensor surface; and using the imaging system to image the sensor chip surface with the portion of target particles captured thereon a plurality of different axial distances from the objective of the imaging system, thereby obtaining the images of the postscan stack.

In certain embodiments, the sensor chip surface is a top surface of a thin partially transparent layer (e.g., an oxide layer) on a base substrate (e.g., silicon).

In certain embodiments, the sensor chip surface comprises one or more fiducial markers. The fiducial markers may be reference particles, lithographically defined fiducial markers (e.g., comprising deposited material, such as metal and/or dielectric; e.g., etched into the sensor chip surface).

In certain embodiments, the method comprises using images of the fiducial markers to determine the prescan focal plane position and/or the postscan focal plan position by computing one or more focal metrics, e.g., by computing a score, such as a DoG score (difference-of-Gaussians score), measuring high spatial frequency content, based on a region within each image of the prescan stack and surrounding one or more of the fiducial markers and/or by computing one or more focal metrics, e.g., by computing a score, such as a DoG score, measuring high spatial frequency content based on a region within each image of the postscan stack and surrounding one or more of the fiducial markers.

In certain embodiments, the method comprises using images of the fiducial markers to register the focused prescan image with the focused postscan image, e.g., by: identifying, for each of one or more fiducial markers within the focused prescan image, a set of coordinates (e.g., of a center; e.g., of one or more vertices; e.g., representing one or more edges) locating the fiducial marker, thereby identifying a first set of fiducial coordinates within the focused prescan image; identifying, for each of one or more fiducial markers within the focused postscan image, a set of coordinates (e.g., of a center; e.g., of one or more vertices; e.g., representing one or more edges) locating the fiducial marker, thereby identifying a second set of fiducial coordinates within the focused postscan image; and determining an in-plane shift using the first and second sets of fiducial markers.

In certain embodiments, step (e) comprises: identifying a prescan background region within the focused prescan image; identifying a postscan background region within the focused postscan image; and using the prescan background region and the postscan background region to determine a fine in-plane shift. The fine in-plane shift may be a transverse (e.g., X-Y) plane and/or a fine in-plane rotation, e.g., a rotation in a transverse (e.g., X-Y) plane.

In certain embodiments, the method comprises repeatedly: applying varied 2D in-plane shifts and/or rotations to one background region (e.g., the prescan background region) and/or image (e.g., the focused prescan image) relative to the other (e.g., the postscan background region and/or the focused postscan image); (e.g., subsequently, after shifting) subtracting the prescan background region from the postscan background region, thereby obtaining a subtracted image; and computing a measure of variation (e.g., a standard deviation) using the subtracted image (e.g., and determining the optimal 2D shift and/or rotation to be the one that minimizes the measure of variation).

In certain embodiments, the method comprises: identifying a first prescan background region and a first postscan background region, and using the first prescan background region and the first postscan background region to determine a fine in-plane shift, e.g., a shift in a transverse (e.g., X-Y) pane; and identifying a second prescan background region and a second postscan background region, and using the second prescan background region and the second postscan background region to determine a fine in-plane rotation, e.g., a rotation in a transverse (e.g., X-Y) plane. In these embodiments, the second prescan background region may be larger than the first prescan background region and the second postscan background region may be larger than the first postscan background region.

In certain embodiments, step (f) comprises: dividing the imaged first region of the prescan stack and the imaged second region of the postscan stack into a plurality of sub-regions (e.g., quadrants); and for each of the plurality of sub-regions, determining a corresponding optimal image pair comprising an optimal prescan image and an optimal postscan image (e.g., thereby accounting for out-of-plane tilt).

In certain embodiments, for each particular sub-region of the plurality of sub-regions, determining the corresponding optimal image pair comprises: repeatedly obtaining test image pairs, each test image pair comprising a prescan image selected from the prescan stack and a postscan image selected the postscan stack and, for image pair, computing a measure of background variation between the prescan image and the postscan image within the particular sub-region; and selecting the optimal image pair for the particular based on the computed measures of background variation.

In certain embodiments, step (f) comprises, for each particular sub-region, using the corresponding optimal image pair to create a corresponding final sub-region image for the particular sub-region.

Systems that remove background from interferometric images are also described herein and may comprise a processor of a computing device; and a memory having instructions stored thereon, wherein the instructions, when executed by the processor, cause the processor to perform the method of any one of the aspects and embodiments described herein.

In certain embodiments, the system comprises an imaging device and/or a sensor chip.

In certain embodiments, the sensor chip surface is a top surface of a thin partially transparent layer (e.g., an oxide layer) on a base substrate (e.g., silicon).

Elements of embodiments involving one aspect of the invention (e.g., methods) can be applied in embodiments involving other aspects of the invention, and vice versa.

BRIEF DESCRIPTION OF THE DRAWINGS

FIG. 10B is a graph of the standard deviation of the difference between the two images depicted in FIG. 10A as one image is rotated over the other image.

DETAILED DESCRIPTION

Presented herein are methods and systems for analyzing images to remove or minimize background noise in the images, and thus improve the visibility of particles (e.g., small particles, target particles). The methods and systems may use stacks of images and an affine transformation that accounts for rotation and translation in the images to remove or reduce the background noise in images taken after placement of samples on a sensor surface. In addition to rotation and translation, the affine transformation may take into account magnification and/or scaling factors during the registration process.

The particles that may be detected by the imaging include, but are not limited to, extracellular vesicles, exosomes, viruses, virus-like particles, or lipid nanoparticles. The particles may be small particles having diameters ranging from about 20 nm to about 100 nm, including all values and sub-ranges therein. For example, the diameter of the small particles may be about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, or about 100 nm.

The particles may be contained within various types of samples such as samples of cells, organisms, lysed cells, cellular extracts, nuclear extracts, components of cells or organisms, extracellular fluid, media in which cells are cultured, blood, plasma, serum, gastrointestinal secretions, homogenates of tissues or tumors, synovial fluid, feces, saliva, sputum, cyst fluid, amniotic fluid, cerebrospinal fluid, peritoneal fluid, lung lavage fluid, semen, lymphatic fluid, tears, or prostatic fluid. In addition, a sample may be a viral or bacterial sample, a sample obtained from an environmental source, such as a body of polluted water, an air sample, or a soil sample, as well as a food industry sample. Detection of the particles in the images may be used to classify, diagnose, and/or monitor a disease in a patient, or select a treatment option for the patient.

Figure 1:
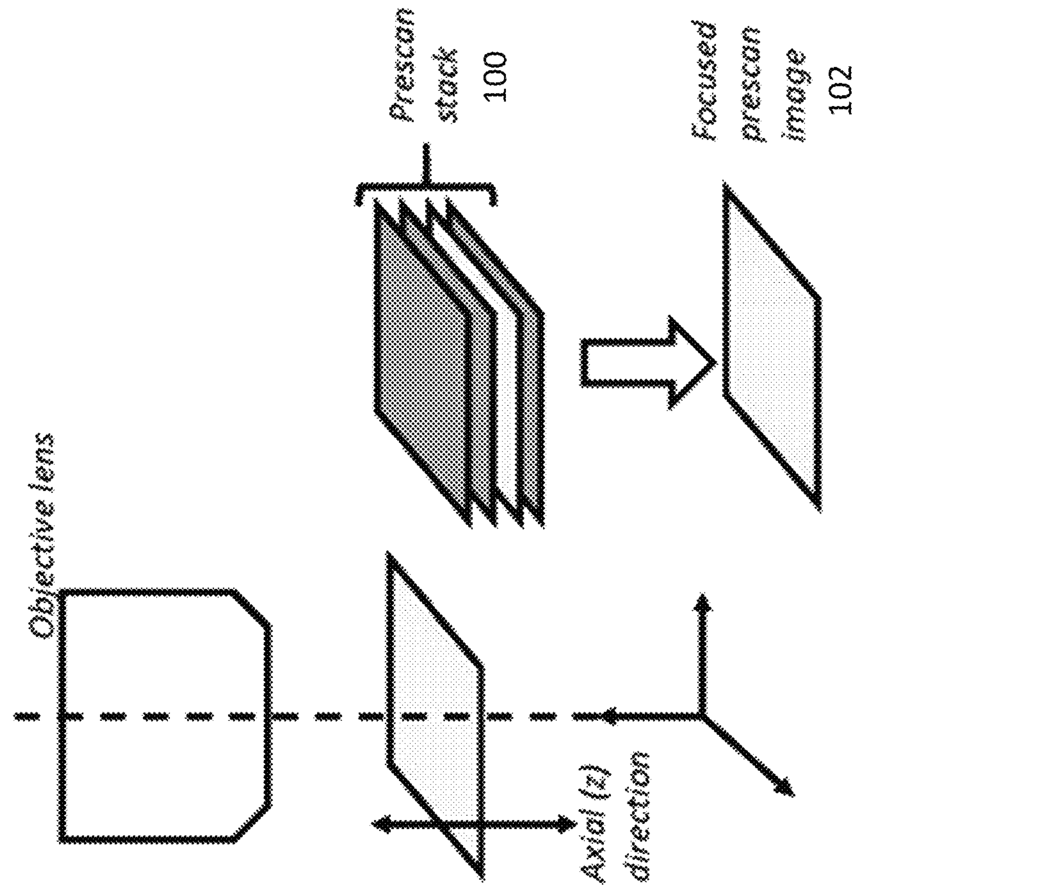
FIG. 1 is a schematic illustrating an exemplary method for obtaining a prescan stack.
Figure 2:
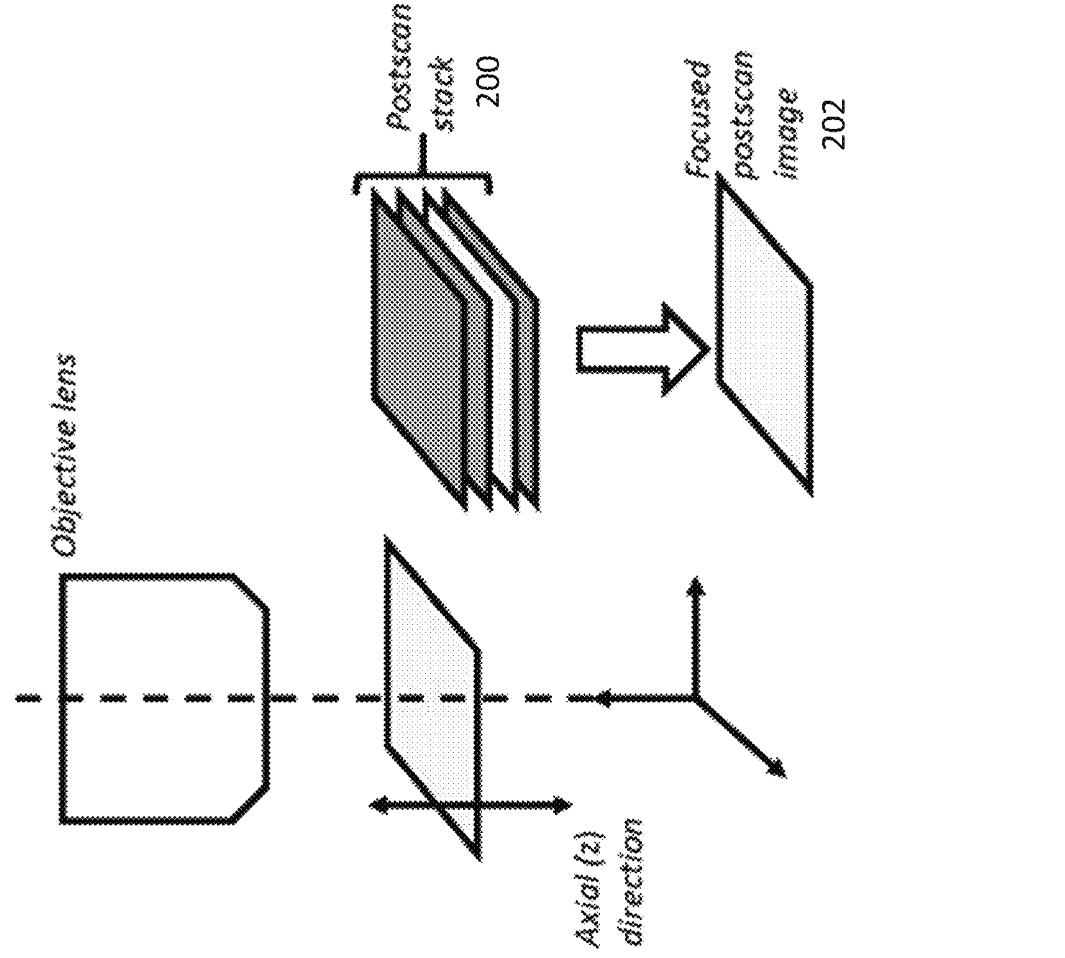
FIG. 2 is a schematic illustrating an exemplary method for obtaining a postscan stack.

The methods and systems of the present disclosure may utilize stacks of images, comprising multiple images taken of a sensor chip surface at different axial positions. In some embodiments, the methods and systems may obtain images of the particles when the particles are in a liquid medium. As illustrated in FIG. 1, a prescan stack 100 may be obtained prior to contacting the surface of the sensor chip with a particular sample. Turning to FIG. 2, after contacting (e.g., incubating) the surface of the sensor chip with the sample, a postscan stack 200 may be obtained. As described herein, the prescan and postscan stacks (100, 200) may be used to identify a focused prescan image 102 and a focused postscan image 202.

In certain embodiments, reference particles, such as polystyrene beads, are intentionally affixed to the surface of the sensor, so as to create artificial reference features at the surface of the sensor chip. These features can then be detected within images of the prescan and/or postscan stacks, and used to identify focal positions. Reference particles may be bound to a sensor surface in a variety of ways, for example using antibodies (e.g., IgG, e.g., mouse IgG), biotin, streptavidin, etc. In certain embodiments, polystyrene sulfate particles (e.g., OptiBind™) may be used as reference particles. In additional to polystyrene particles or beads, other types of beads that may be used include silica beads or latex beads.

Figure 3:
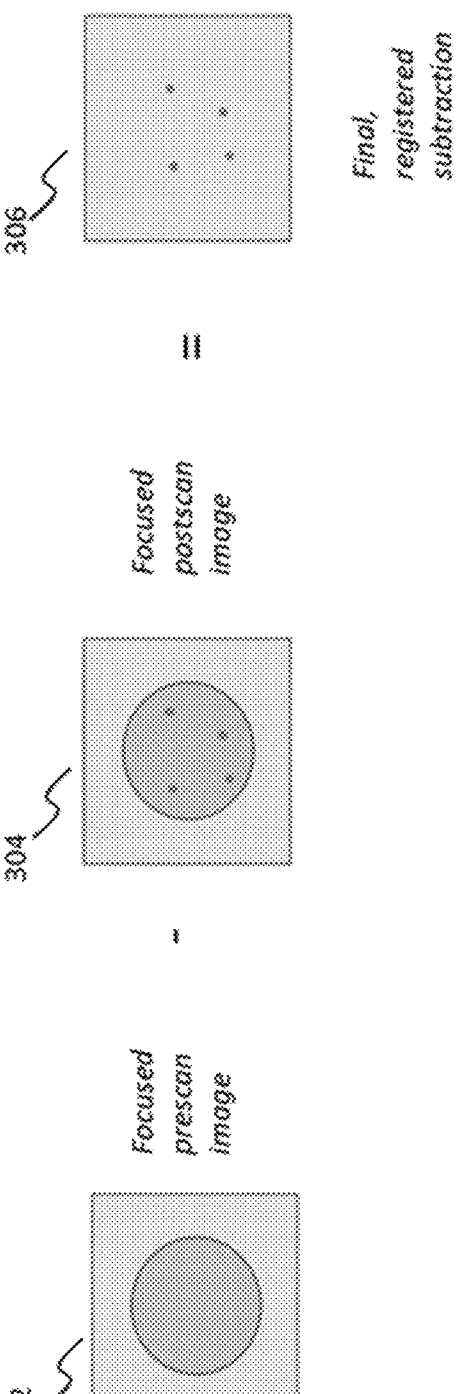
FIG. 3 is a schematic illustrating how focused prescan and focused postscan images are registered with each other and used to obtain an image with removal of background.

Turning to FIG. 3, in certain embodiments, focused prescan 302 and focused postscan 304 images are registered to each other to align features in a sample (e.g., transverse) plane, as shown in registered subtraction image 306. In certain embodiments, registration is performed using an affine transformation. In certain embodiments, reference particles may also be used as fiducial marks for image registration. In certain embodiments, other fiducial marks on the sensor chip surface may be used for registration. In certain embodiments, sub-pixel registration is achieved.

Figure 4:
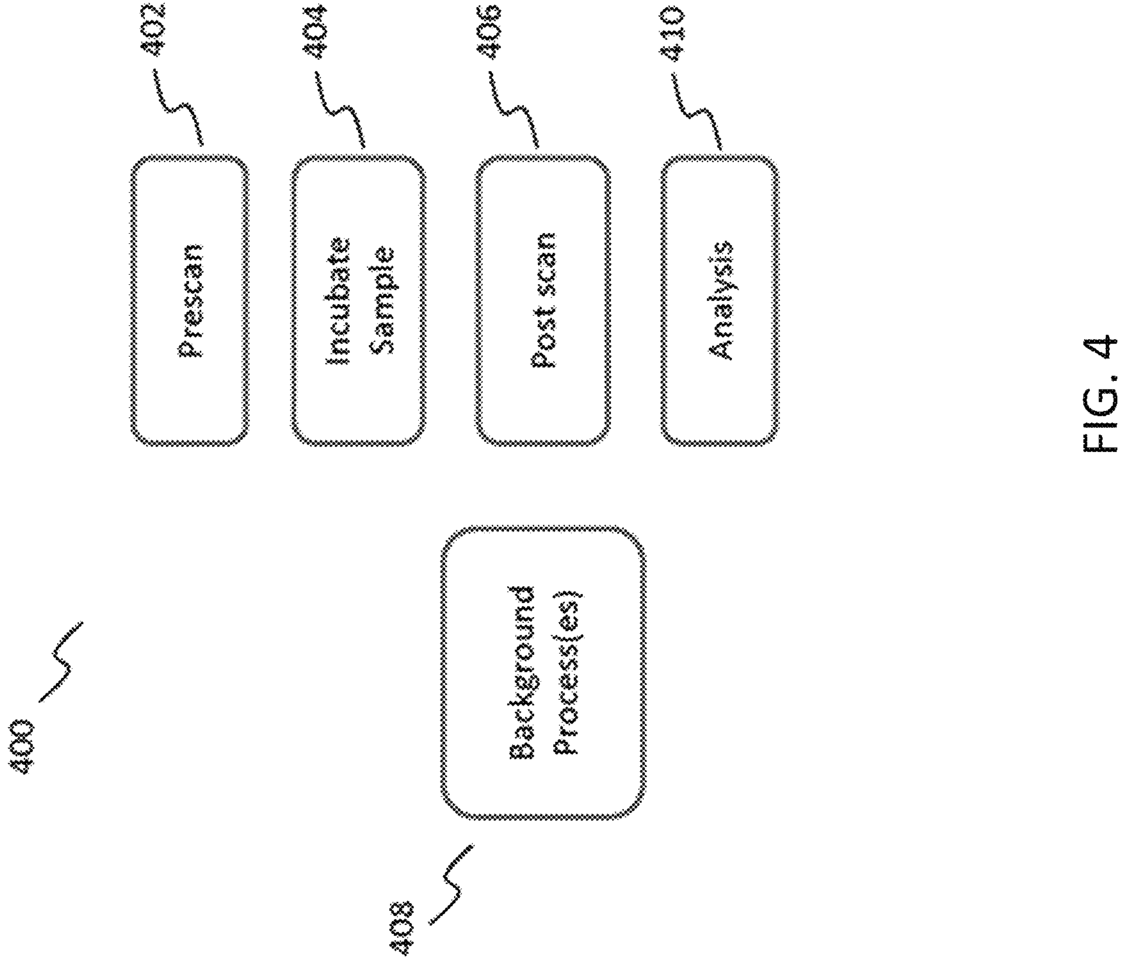
FIG. 4 illustrates an exemplary method for sample analysis.

FIG. 4 is an illustrative embodiment of a method 400 for sample analysis in accordance with various embodiments described herein. In certain embodiments, a surface of the sensor may have one or more spots (e.g., pre-defined spots) on the surface of the sensor. In certain embodiments, the pre-defined spot(s) may have one or more binding agents (e.g., a protein, an antigen, an antibody) for binding to a particle (e.g., a biological particle, e.g., an extracellular vesicle, a virus). As shown in FIG. 4, a prescan stack comprising a plurality of images (e.g., at different axial positions) of a sensor chip surface is obtained 402. The prescan stack may be obtained prior to incubating a sample on the surface of the sensor 404. In certain embodiments, a prescan is performed using an interferometric imaging platform, suitable (e.g., for imaging at a sufficiently high resolution and/or magnification) for imaging single particles having, for example, sub-micron sizes (e.g., diameters less than or equal to 1 micron). In certain embodiments, interferometric imaging platforms such as a single-particle interferometric imaging sensor system, suitable for imaging particles having diameters on the order of and below 100 nm, described, for example in PCT Application Nos. PCT/US2017/016434, filed Feb. 3, 2017; PCT/US2019/034831, filed May 31, 2019; and PCT/US2020/016098, filed Jan. 31, 2020, each of which is incorporated herein by reference in their entirety, may be used. In certain embodiments, a prescan is performed using another imaging platform (e.g., a microscope).

After acquiring a prescan stack, a sample (e.g., a biological sample) comprising particles, such as extracellular vesicles, viruses, virus-like particles, lipid nanoparticles, and the like, to be imaged is then incubated on the surface of the sensor chip surface 404 in order to capture one or more particles on the surface of the sensor. In certain embodiments, the particles adhere to spots (e.g., pre-defined spots) on the surface of the sensor using one or more binding agents. In certain embodiments, the particles may be labeled with a secondary marker (e.g., a fluorophore).

After sample incubation on a sensor 404, a post scan stack is acquired 406. In certain embodiments, the postscan stack and prescan image are both acquired using the same imaging device or platform (e.g., as described herein). One or more background processes (408) (e.g., as described herein) are used to process prescan and/or postscan images. In certain embodiments, background processes may include background subtraction, image registration (e.g., image alignment) (e.g., rotation, translation), image masking, tilt, compensation for magnification and/or scaling due to environmental factors (e.g., temperature and/or humidity) or another image processing method (e.g., as discussed herein).

Background processes (408) as described herein may be performed, e.g., by a processor, automatically, for example with no and/or substantially limited (e.g., limited to a click to initiate, final quality control review, etc.) user interaction. In particular, background processes 408 may include processes described herein that register images of the prescan stack to images of the postscan stack, not only in-plane but also identifying appropriate focal plane positions, to allow for a registered subtraction to be performed whereby a particular prescan image is subtracted from a particular postscan image in order to minimize background intensity fluctuations and allow for high-sensitivity particle imaging.

Final particle images obtained via registered subtraction approaches as described here may be further analyzed to detect and characterize target particles of interest. Further analysis may include, identifying a number, type, and/or size (e.g., diameter, mass), etc., of particles bound to the sensor surface.

In certain embodiments, imaging is performed using an imaging system based on single-particle reflectance imaging sensor (SP-IRIS) imaging technology. SP-IRIS technology, including its use in combination with fluorescence imaging for particle detection and characterization, is described in further detail in PCT Application Nos. PCT/US2017/016434, filed Feb. 3, 2017; PCT/US2019/034831, filed May 31, 2019; and PCT/US2020/016098, filed Jan. 31, 2020, each of which is incorporated herein by reference in its entirety.

A. Image Stacks

In certain embodiments, the image processing approaches described herein utilize and process image stacks. As used herein, the term "stack" when used in reference to images, such as an "image stack," a "prescan stack," "postscan stack," etc. refers to a plurality of images of a sample recorded at varying axial distances (of the sample) with respect to an imaging lens, such as an objective lens, of an imaging system. Accordingly, in certain embodiments, each image of an image stack represents a different offset distance, along an axial direction, with respect to a focal plane of the imaging system. For example, as shown in FIG. 1 and FIG. 2, an image stack (100, 200) comprises multiple image slices, each recorded at, and corresponding to, a different axial location. Each image slice has spatial coordinates in two-dimensions, with pixels representing different spatial locations of a sample within a transverse (e.g., an x-y) plane, and a single axial (e.g., z-) coordinate or slice index, corresponding to a spatial location of the sample along the axial direction.

In certain embodiments, images of image stacks are recorded at fixed intervals, such that a distance between the axial locations at which each image and an adjacent image are recorded is the same for all images. For example, an image stack may be taken by locating a sample at a minimum axial location, and moving it upwards in fixed steps, pausing at each step to record an image. For example, an image stack may be taken by locating a sample at a maximum axial location, and moving it downwards in fixed steps, pausing at each step to record an image. In certain embodiments, an axial distance between adjacent images of an image stack is less than about 1 micron. In certain embodiments, an axial distance between adjacent images of an image stack is less than about 500 nanometers. In certain embodiments, an axial distance between adjacent images of an image stack is less than about 200 nanometers. In certain embodiments, an axial distance between adjacent images of an image stack is less than about 100 nanometers. In certain embodiments, an axial distance between adjacent images of an image stack is less than about 50 nanometers.

In certain embodiments, an axial distance between adjacent images of an image stack varies between different adjacent pairs of images in an image stack. For example, a first increment (e.g., between steps for taking different images) may be used near maximum and minimum boundaries of the stack and a second increment (e.g., a smaller, finer increment) may be used nearer to a center of the range of axial distances, for example within a particular vicinity of an expected focal plane position. In certain embodiments, axial steps between adjacent images of an image stack are determined as a function of step number, for example using a functional form such as a polynomial (e.g., quadratic).

As described herein, image stacks may be recorded for sensor chips that comprise a substantially planar surface on which biomolecule capture probes are spotted, which in turn may be used to bind target particles of interest, such as extracellular vesicles, viruses, virus-like particles, lipid nanoparticles, and the like. Other features, such as lithographically defined fiducial markers, reference particles such as polystyrene beads, as described herein, may also be present on a surface of a sensor chip.

In certain embodiments, the sensor chip may comprise a $SiO_2$ surface. In certain embodiments, the sensor chip may be a substantially single material, such as glass slide, or other substantially transparent (e.g., within a visible and/or near infrared spectral region) material. In certain embodiments, the sensor chip comprises a multi-layered substrate, such as thin, semi-transparent layer on top of a base substrate. In certain embodiments the semi-transparent layer is or comprises $SiO_2$. In certain embodiments, the semi-transparent layer has a thickness of about 1 micron or less. In certain embodiments, the semi-transparent layer has a thickness of about 500 nm or less. In certain embodiments, the semi-transparent layer has a thickness of about 200 nm or less. In certain embodiments, the semi-transparent layer has a thickness of about 100 nm or less. In certain embodiments, the base substrate is or comprises silicon (Si).

In certain embodiments, when an image of a sensor chip is recorded, a sensor chip is located roughly at a particular axial distance from an imaging (e.g., objective) lens, for example by virtue of a sample holder. In certain embodiments, while a surface of a sensor chip is substantially planar, various target particles of interest, biomolecules, and features of interest are physical, three-dimensional objects, and may be located at varying distances above a sensor chip surface. For example, particles such as viruses and exosomes have diameters on the order of several tens to hundreds of nanometers and, accordingly, their centers may be located above the chip surface. Additionally or alternatively, capture probes and various surface chemistries may also result in target particles being located at non-negligible heights above sensor chip surfaces. Additionally or alternatively, where a sensor chip comprises multiple layers, additional, e.g., buried, layer surfaces may be located at axial positions beneath an upper-most surface of a sensor chip.

Accordingly, in certain embodiments, depending on a particular positioning of a sensor chip, various features, such as an upper-most surface of the sensor chip, various particles located thereon, and any additional (e.g., reflective) lower surfaces, may be located at different precise axial positions and, accordingly, different offsets from an absolute focal plane of an imaging system. Depending, for example, on precise positioning of the focal plane with respect to, e.g., particles of interest, visibility of the particles may be influenced, such that for detection of small particles, optimization of sample position with respect to a focal plane is desired. Additionally or alternatively, in certain embodiments, the ability to consistently align images in the axial direction when a sensor chip is removed and replaced in a sample holder allows processing of multiple images to be used, for example, for background correction, thereby allowing low-visibility particles to be detected and quantitatively analyzed.

Without wishing to be bound to any particular theory, it is believed that axial positioning with respect to a focal plane is particularly important for interferometric imaging modalities, where imaged light intensity is not merely a function of e.g., scattering from particles alone, but, rather, results from phased interference between scattered fields from particles and light reflected from a sensor chip surface. In certain embodiments, slight phase differences between reflected and scattered fields (e.g., which may result from different distances from a focal plane of the imaging system) can lead to significant variations in image intensity.

Accordingly, in certain embodiments, rather than obtain a single image at a single axial location, approaches described herein utilize image stacks, which allows for images at multiple axial locations to be obtained, and analyzed. In this manner, for example, an optimal axial location can be identified after imaging, e.g., in processing and/or, in certain embodiments, multiple images in a stack analyzed to enhance detection sensitivity and accuracy.

The image stacks may be analyzed to perform accurate background correction (e.g., subtraction). In particular, in certain embodiments, a prescan (image) stack is recorded for a sensor chip prior to contacting it with a sample of interest. In this manner, a prescan stack provides images of a sensor chip surface before particles of interest are bound. In certain embodiments, a prescan stack is recorded after a sample has been spotted with capture probes, but just prior to contacting with sample comprising particles of interest. In certain embodiments, after a sensor chip is contacted with a sample of interest (e.g., and bound with target particles) a subsequent, postscan stack is recorded.

In certain embodiments, images of the postscan stack comprise features representing bound target particles of interest, along with background noise, which may result from features such as surface roughness and variations due to, for example, spotted capture probe material. Since background noise such as surface roughness and variations due to chip surface preparation may be, also, present in images of the prescan stack, it can be substantially removed, for example by subtraction or division.

In certain embodiments, a position, e.g., axial and/or transverse, of a sensor chip may be changed between collection of a prescan and postscan stack. For example, after a prescan stack is recorded, a chip may be removed from an imaging device so it can be spotted with sample and subjected to various processing steps, rinsed and dried, and replaced in an imaging device for postscan imaging. Accordingly, in certain embodiments, prescan and postscan image stacks are aligned in an axial direction and/or registered in a transverse plane, to allow for accurate background correction.

B. Aligning Image Stacks and Determining Focal Plane Positions

In certain embodiments, prescan and postscan image stacks are aligned to allow each of one or more particular postscan images to be matched to a corresponding prescan image that is recorded at a substantially same axial location. For example, in certain embodiments even if identical nominal z-positions of a sample stage are used to collect prescan and postscan stacks, variations in stage accuracy and positioning of the sensor chip in a sample holder can produce an offset (e.g., a fixed offset) in the axial direction between images of a prescan stack and those of a postscan stack. For example, a prescan stack and postscan stack might each comprise ten images, but an actual axial position of a first postscan image might most closely match that of a third prescan image, and an axial position of a second postscan image most closely match that of a fourth prescan image, and so on, e.g., with a fixed two-image offset. Accordingly, in certain embodiments, a prescan and postscan stack are aligned so that particular images of each stack that most closely match, in terms of an axial position at which they were recorded, can be compared to each other, for example for purposes of background correction.

In certain embodiments, aligning a prescan stack with a postscan stack comprises determining one or more focal metrics for each image of the prescan stack and/or the postscan stack. For example, in certain embodiments, a focal plane metric may be determined for a particular image of an image stack based on one or more detected features within the image.

For example, in certain embodiments reference particles, such as polystyrene beads are placed on a sensor chip surface, before it is contacted with a sample of interest, in order to provide features that can be used to compute certain focal plane metrics. For example, in certain embodiments, a focal plane metric is a number of particles within a particular region (e.g., a reference region). In certain embodiments, a focal plane metric is a measure of reference particular contrast. In certain embodiments, a measure of reference particle contrast may be, for example, a statistical measure computed based on measurements of a plurality (e.g., 10 or more, 100 or more, 500 or more) of reference particles located within a particular region (e.g., a reference region), such as an average contrast, a median contrast, a mode, etc. In certain embodiments, a focal plane metric is a measure of reference particle size. In certain embodiments, a measure of reference particle size may be, for example, a statistical measure computed based on measurement of a plurality (e.g., 10 or more, 100 or more, 500 or more) of reference particles located within a particular region (e.g., a reference region), such as an average size, a median size, a mode, etc.

Additionally or alternatively, in certain embodiments, sensor chips may comprise fiducial markers, such as lithographically (or otherwise micro-/nano-fabricated) fabricated markers, examples of which are shown in FIGS. 6C, 7A, 7B, and 9A. Fabricated markers may, for example, comprise deposited material such as metal or dielectric, and/or may be etched into a surface of a sensor chip. In certain embodiments, by virtue of the presence of fabricated markers, certain focal plane metric can be computed for a particular image via analysis of one or more portions (e.g., subregions) of the particular image that comprise one or more reference markers. For example, in certain embodiments, a numerical score representing measure of spatial frequency content may be computed for a region of an image. For example, in certain embodiments a difference-of-Gaussians (DoG) score may be computed for a particular image by creating two blurred versions of a reference region of the particular image, e.g., by convolving with differently sized (i.e., having a different standard deviation) Gaussian functions, and subtracting one from the other, in a pixel-wise fashion, to create a DoG image. This DoG approach emphasizes high spatial frequency edges, and intensity values of each pixel can be summed over the reference region, to generate a single numerical value as the DoG score for the image. Other approaches may be used to score images based on their spatial frequency content within particular reference regions (e.g., based on Fourier Transform calculations and the like).

Figure 6B:
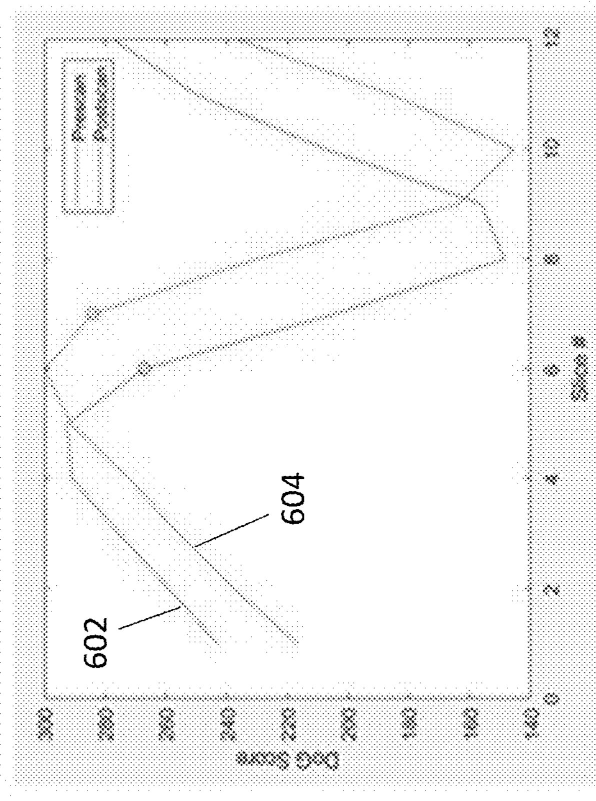
FIG. 6A and FIG. 6B show two exemplary DoG focus curves from prescan and postscan image stacks acquired from reference spots on a region of a substrate.
Figure 6C:
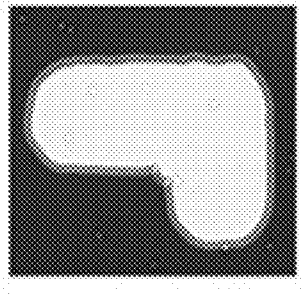
FIG. 6C depicts an exemplary image of a reference spot on the substrate.
Figure 6A:
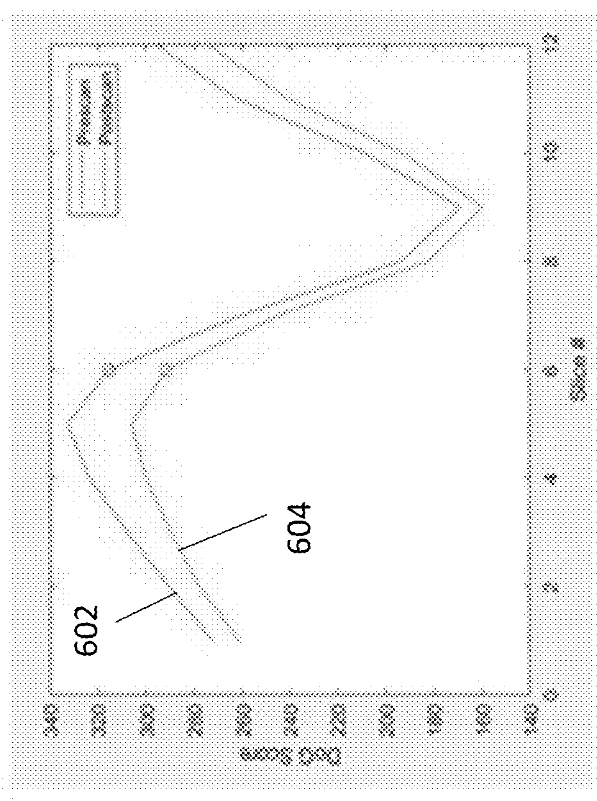

In certain embodiments, focal metrics computed for images of prescan and postscan stacks can be used to align (e.g., determine an offset) a prescan image stack with a postscan image stack by analyzing focal metric curves, for example as shown in FIGS. 6A and 6B. For example, in certain embodiments a prescan focal plane location can be determined from focal metrics computed for a prescan stack. The prescan focal plane location can be used to identify a focused prescan image. As used herein, the term "prescan focal plane position" refers to a particular image slice index and/or axial (e.g., z-) coordinate within a prescan stack that are determined, e.g., by a processor, to satisfy certain target criteria and, accordingly, represent a suitably focused image position. For example, as shown in FIGS. 6A and 6B, a prescan focal plane position is determined by finding a peak DoG score and incrementing the slice index by one. The focused prescan image is the image at the prescan focal plane position. Likewise, postscan focal plane position and focused postscan image may be identified similarly. As shown in FIG. 6A, a prescan focal plane position 602 may match a postscan 604 focal plane position, or, as shown in FIG. 6B, they may be different.

In certain embodiments, prescan images may be matched to postscan images by computing comparison metrics based on a pairwise comparison of a particular prescan image with a particular postscan image. For example, in certain embodiments, an image pair comprising a particular prescan image and a particular postscan image is obtained, the two images subtracted from each other, and a standard deviation computed. In certain embodiments, matching sub-regions (e.g., representing a same physical region on a sensor chip) are identified and the subtraction is performed within the matching sub-regions. A standard deviation may then be computed for the particular sub-region, rather than, e.g., the entire image. These sub-regions may be identified so as to, for example, reflect background variations. Additionally or alternatively, as described in further detail herein, sub-regions may also be used to account for relative tilt of a sensor chip between times when, e.g., a prescan stack and a postscan stack is recorded. Various pairs of images can be compared, so as to search for an optimal pair that minimizes background standard deviation. In certain embodiments, this approach can be used to adjust for additional offsets due to, for example, tilt, as described in Example 2 below.

Figure 12:
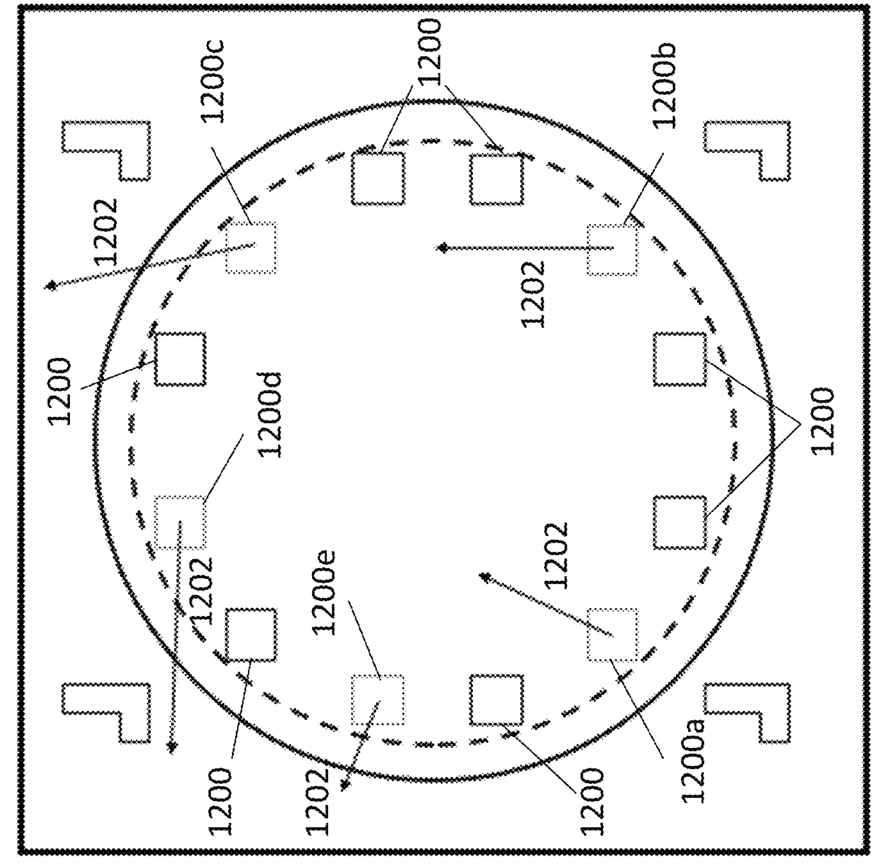
FIG. 12 depicts an exemplary image of a chip including a plurality of sub-regions used to create an affine transformation that accounts for magnification and/or scaling due to environmental factors.

In addition to rotation and translation, prescan and postscan images may be aligned using an affine transformation that takes into account magnification and/or scaling factors. As previously discussed, environmental factors such as temperature and humidity may affect the images during the registration process. Accordingly, in some embodiments, the local translational shift in the x-y plane between sub-regions of the prescan and postscan images may be determined. The local translational shift may be determined by the steps described for masking and fine x-y alignment in Example 2 below. Next, a plurality of sub-regions may be analyzed for local translation shift to identify those having acceptable results. Between 2 to 12 sub-regions may be analyzed for acceptable results. For example, 2 sub-regions, 3 sub-regions, 4 sub-regions, 5 sub-regions, 6 sub-regions, 7 sub-regions, 8 sub-regions, 9 sub-regions, 10 sub-regions, 11 sub-regions, or 12 sub-regions may be analyzed. An acceptable result may be, e.g., if the standard deviation of the difference between the sub-regions in the prescan and postscan images is a minimum standard deviation (e.g., a difference in percent contrast of not more than about 0.2%). The number of acceptable sub-regions from which local translational shift information may be obtained and used to fit an affine transformation may range from 2 to 5. For example, the number of acceptable sub-regions from which local translational shift information may be obtained and used to fit an affine transformation may be 2, 3, 4, or 5. In some embodiments, the number of acceptable sub-regions from which local translational shift information may be obtained and used to fit an affine transformation may be 3. In other embodiments, the number of acceptable sub-regions from which local translational shift information may be obtained and used to fit an affine transformation may be 5. For example, as shown in FIG. 12, 12 sub-regions 1200 on a chip 1204 may be analyzed for local x-y translation, as indicated by the arrows 1202. Information from the 5 acceptable sub-regions 1200*a*, 1200*b*, 1200*c*, 1200*d*, and 1200*e* may then be used in an affine transformation that accounts for magnification. The use of local translational shift information from 5 sub-regions may be beneficial when magnification changes are on the order of 0.5% to about 1.0%. In some embodiments, use of local translational shift information from 5 sub-regions may be beneficial in imaging particles less than about 40 nm.

C. In-Plane Image Registration

In certain embodiments, images of a prescan stack and images of a postscan stack are also registered with respect to each other in a transverse (e.g., x-y) plane. In certain embodiments, a particular prescan image and a particular postscan image are analyzed together to determine a transformation to apply to register images of the prescan stack and postscan stack. For example, in certain embodiments, once a focused prescan image and a focused postscan image are obtained (e.g., as described herein), they are analyzed to compute an in-plane shift and rotation.

Figures 7A, 7B:
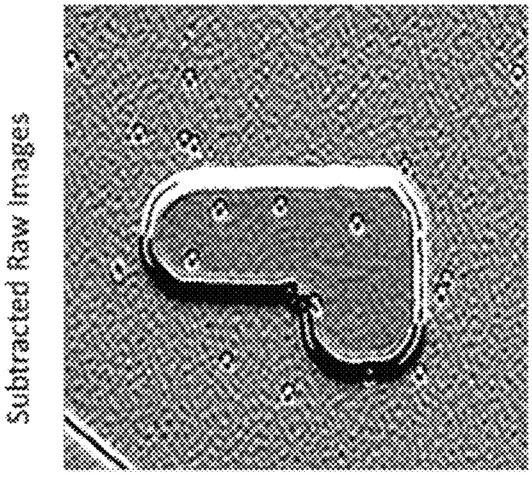
FIG. 7A is an exemplary image of a reference region where prescan and postscan images of the same focal plane have been subtracted without alignment in the X-Y plane.
FIG. 7B is an exemplary image of the same reference spot as FIG. 7A where prescan and postscan images have been coarsely aligned using the determined X-Y offset prior to subtraction.

In certain embodiments, a coarse in-plane shift (e.g., in an x-y plane) is determined, for example, by using reference particles and/or fiducial markers on chip surfaces. In certain embodiments, for example, coordinates of reference particles and/or fiducial markers may be identified within a focused prescan image and a focused postscan image and matched to each other to determine an in-plane shift. For example, matching fiducial markers may be identified in a focused prescan image and a focused postscan image, and coordinates, such as a center of mass, vertices, edges, etc., aligned to compute an in-plane (e.g., x-y) shift. Results of an example coarse x-y registration are shown in FIGS. 7A and 7B, and described in further detail in Example 2.

In certain embodiments, a fine in-plane registration may also be performed, for example following a coarse registration. Fine registration may be performed by identifying a first background region in a focused prescan image, along with a second, matching (e.g., corresponding to a substantially same physical region on a sensor chip surface) background region in a focused postscan image. The first and second background regions may be identified by locating matching regions (e.g., rectangular sub-regions) in a vicinity of a fiducial marker that appears in both the focused prescan image and the focused postscan image. In certain embodiments, the first and second background regions are located within the boundaries of a fiducial marker. In certain embodiments, the first and second background regions are located outside the boundaries of a fiducial marker.

In certain embodiments, the first background region is subtracted from the second background region and a measure of variation across the resultant subtraction image, such as a standard deviation in pixel intensity, computed. In certain embodiments, a mask is applied to remove particles and/or a fiducial marker from the first and second background regions, for example to measure primarily variation in pure background (e.g., not due to presence of particles). In certain embodiments, this process is repeated as (e.g., small, e.g., on the order of 10 or less or 50 or less pixels) shifts in an x and/or y direction are applied to one image relative to the other. As illustrated in FIG. 9B, an optimal shift can be identified as the shift that produces a minimum standard deviation (or other measure of variation).

Figure 10B:
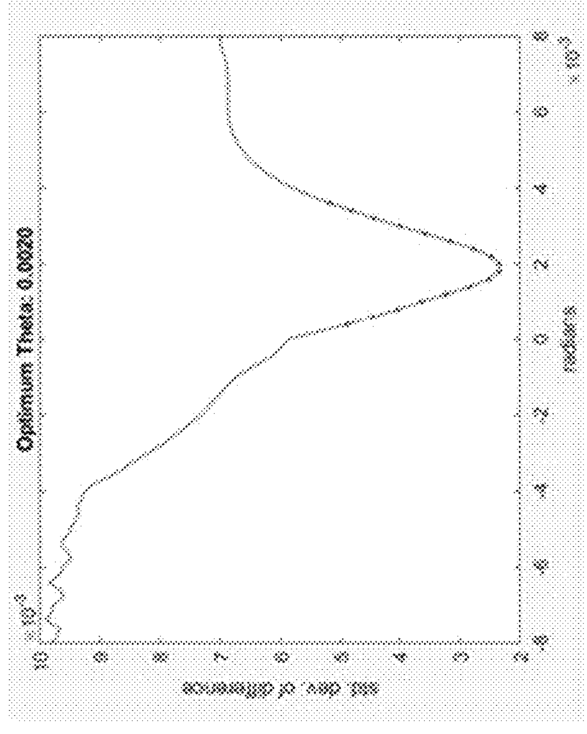
FIGS. 10A and 10B show an exemplary process for rotational alignment between prescan and postscan images.

In certain embodiments, additionally or alternatively, a rotational shift is determined using the focused prescan image and the focused postscan image. For example, in certain embodiments, the focused prescan image is subtracted from the focused postscan image and a measure of variation across the resultant subtraction image, such as a standard deviation in pixel intensity, computed. In certain embodiments, a mask is applied to remove particles and/or a fiducial marker from the focused prescan image and the focused postscan image, for example to measure primarily variation in pure background (e.g., not due to presence of particles). In certain embodiments, this process is repeated as one image is rotated with respect to the other. As illustrated in FIG. 10B, an optimal shift can be identified as the shift that produces a minimum standard deviation (e.g., or other measure of variation). In certain embodiments, an entire or substantially large portion of a focused prescan image and a focused postscan image are used to perform the subtraction and rotational shift determination. In certain embodiments, a small sub-region is used (e.g., similar to the approach described above with respect to fine x-y alignment).

Figure 11:
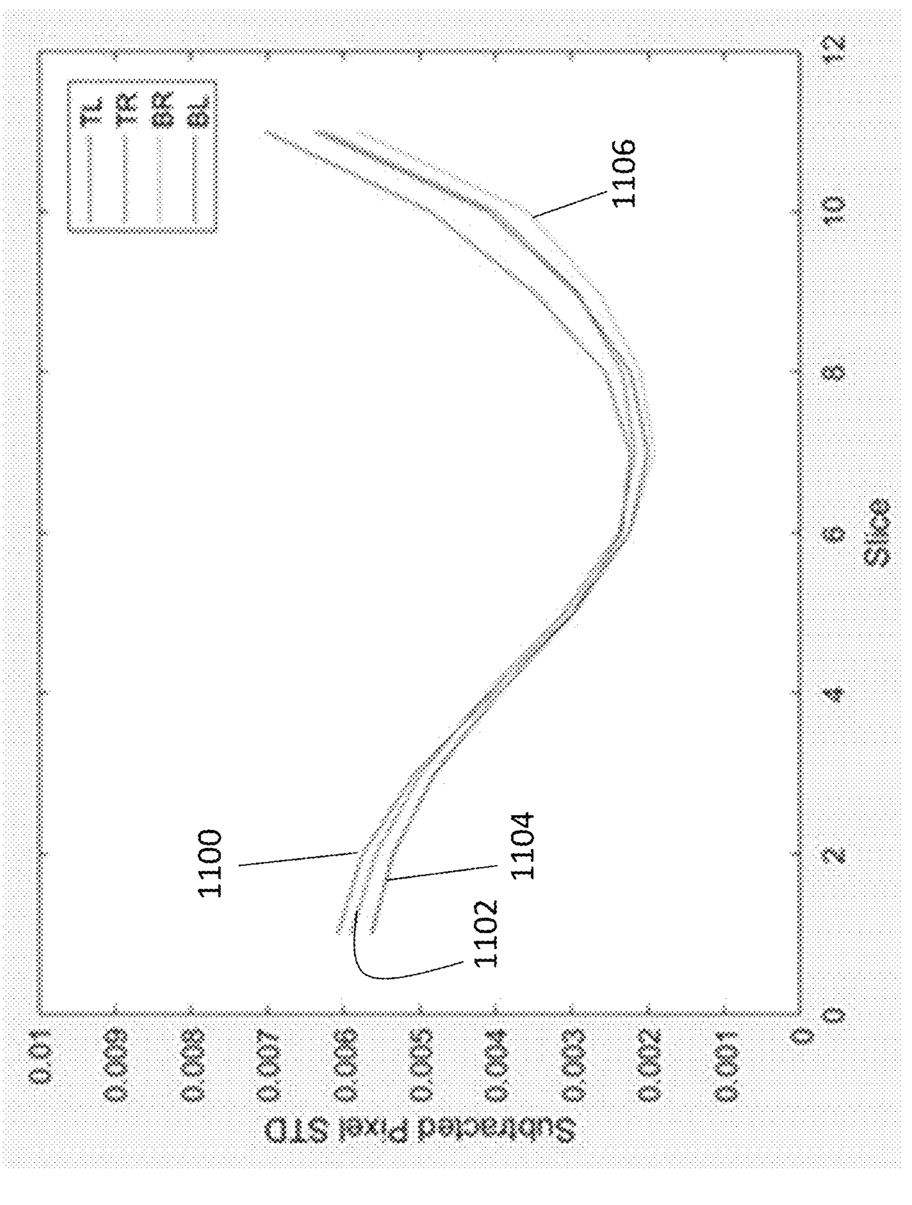
FIG. 11 is an example plot showing optimization of four quadrants of a prescan image as it is scanned along the corresponding quadrants in images of a postscan stack.

In certain embodiments, prescan and postscan stacks may, additionally or alternatively, be used to account for tilt of a sensor chip during imaging. For example, in certain embodiments, an image region may be divided into multiple sub-regions such as, but not limited to, quadrants. As illustrated in FIG. 11, in certain embodiments, each sub-region (e.g., quadrant) of a prescan image may be compared to a matching sub-region (e.g., quadrant) of one or more postscan images (for example, in a pairwise fashion, as described herein, e.g., in Section B) to determine a sub-region specific offset, which may be different for different sub-regions, e.g., due to tilt.

D. Background Subtraction and Final Particle Images

Accordingly, a variety of image alignment and registration steps, as described herein, may be performed, in various combinations to align prescan and postscan images in both an axial and in-plane (e.g., transverse) direction. By virtue of this accurate and three-dimensional (e.g., including axial position) alignment, matching prescan and postscan images, or portions thereof (e.g., sub-regions, so as to account for tilt as described herein) can be identified, and subtracted from each other to generate one or more final particle images. For example, in certain embodiments, a single particle image may be generated from a single prescan image and postscan image of the image stacks. In certain embodiments, each image of at least a portion of a postscan stack is matched to a prescan image of a prescan stack and used to determine multiple final particle images (e.g., at different levels of defocus).

In certain embodiments, subtraction may comprise weighting one or both images and/or dividing by or subtracting out other, e.g., reference images, for example to account for dark current and/or illumination source variation. In certain embodiments, division (e.g., of a postscan image by a prescan image) may be used, in addition to or alternatively to subtraction.

F. Examples

Example 1: Example Extracellular Vesical Detection with ExoView Platform

This example demonstrates detection of extracellular vesicle particles utilizing an embodiment of an SP-IRIS-based imaging device and an embodiment of the image processing approach described herein.

Introduction

The ExoView platform allows researchers to capture extracellular vesicles (EVs) by means of surface antigen-specific antibodies (e.g. tetraspanins) and to enumerate individual particles using two imaging techniques—single-particle interferometric reflectance imaging sensor (SP-IRIS) imaging and fluorescence imaging. SP-IRIS imaging using the ExoView platform has typically had a lower size limit of detection for EVs of about 50 nm. Development of technology able to measure biological particles down to 20 nm would allow for analysis of recently discovered exomeres and supermeres—EV subsets that are less than 50 nm in diameter. In this example, using the R200 ExoView Platform, engineered improvements to the SP-IRIS technique in accordance with certain embodiments described herein allowed detection of EVs as small as 20 nm in diameter. When combined with fluorescent imaging, which does not have a size limit of detection, new insights may be discovered in the surface and cargo expression patterns of different sized populations of EVs.

Methods

Human cell culture media was incubated overnight on chips with printed CD9, CD63, and CD81 antibody capture probes. Immobilized EVs were fixed, permeabilized, and stained with a cocktail of fluorescent antibodies (CD9, CD63, CD81, Syntenin, ALIX, TSG101). Chips were scanned on an ExoView R200 platform, and image analysis was performed using ExoView Analyzer 3.1.

Results

EV size histograms from 30 to 200 nm are presented and show a mode size of less than 50 nm. When EVs are binned based on their size, distinct 4-color expression profiles of the EV markers (CD9, CD63, CD81, Syntenin, ALIX, TSG101) are observed between the size groups.

Summary/Conclusion

In recent years, knowledge of the diversity in size and function of EVs has grown dramatically. Without wishing to be bound to any particular theory, few would have anticipated that particles as small as 25 nm could have a biologically relevant effect on the human body. With these discoveries, developing and utilizing a technology that can reliably measure and phenotype EVs as small as 20 nm offers important functionality for the EV field.

Example 2: Example 3D Image Registration and Subtraction Approach

This example demonstrates an approach for image registration and subtraction utilizing lithographically defined fiducial markers, and compares performance to alternative embodiments in which deposited beads are used.

Sample Workflow

Figure 5A:
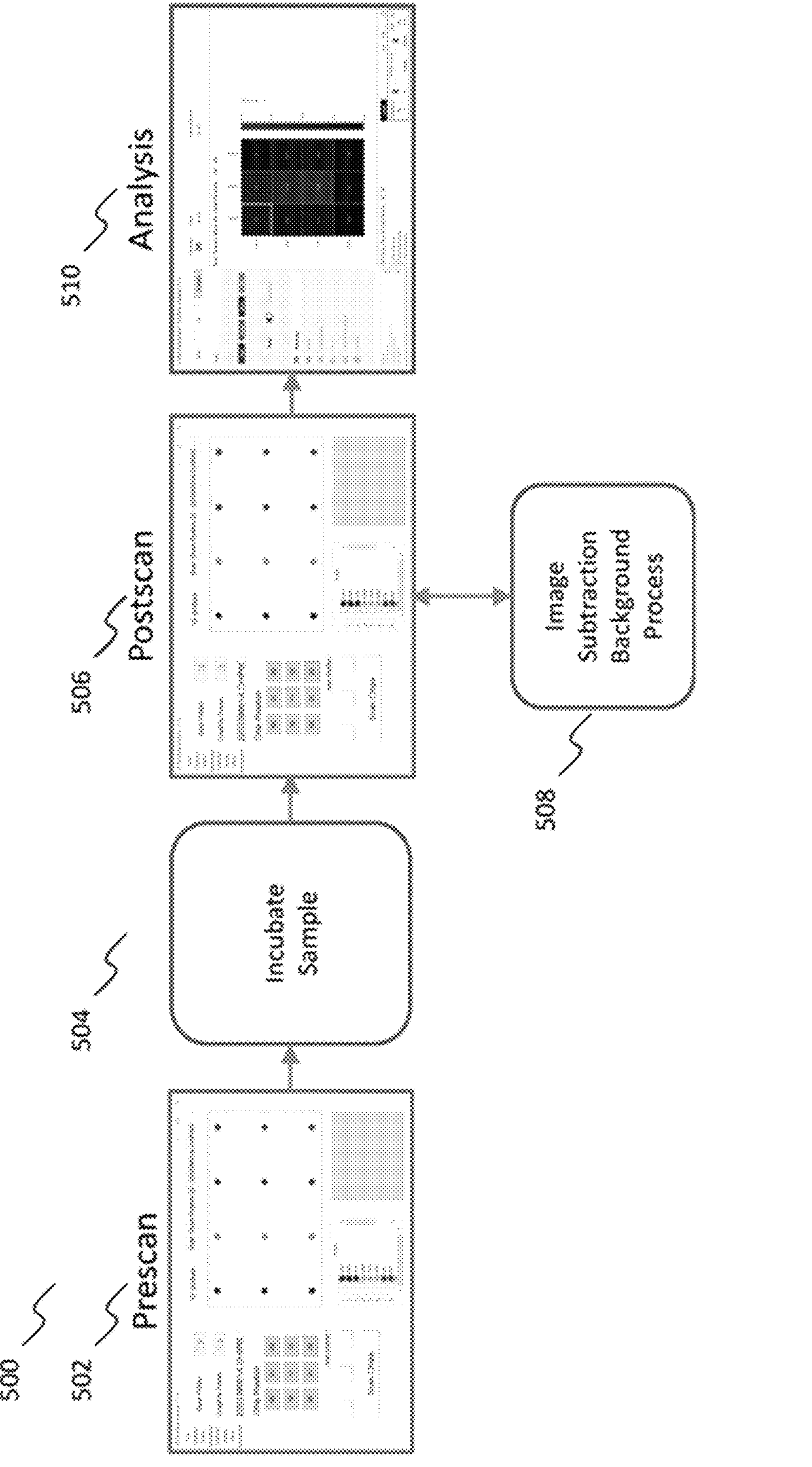
FIG. 5A depicts an exemplary method for image registration and subtraction.

FIG. 5A shows an exemplary workflow 500 used herein. As illustrated in FIG. 5A, the sensor chip may comprises a plurality of probes (e.g., antibody capture probes) bound to the sensor chip surface. The probes may be arranged into multiple spots, each spot having a probe of a particular type, e.g., in a microarray format. The capture probes may be used to immobilize extracellular vesicles (EVs) on the surface of the chip.

Prior to contacting the surface of the sensor chip with a sample of interest, a prescan stack was obtained 502. The prescan stack was be acquired as illustrated in FIG. 1, by imaging the sensor chip surface as the chip is moved (e.g., in a step-wise fashion) in an axial direction, such that each image of the prescan stack is taken at a different distance from the objective lens of the imaging system. After prescanning, a biological sample containing particles (e.g., extracellular vesicles) was incubated on the sensor chip 504, so as to capture target particles onto the surface of the sensor chip. In certain embodiments, incubation may include various processing steps, including, for example, labeling with secondary probes (e.g., fluorophores) and fixation and permeabilization steps (e.g., that provide access to biomolecular cargo within particles such as extracellular vesicles, lipid nanoparticles, and viruses (e.g., enveloped virus).

After incubation, a postscan stack was acquired 506. The postscan stack was acquired in similar fashion to the manner in which the prescan stack is acquired, for example as illustrated in FIG. 2. Image registration and subtraction processes, as described in further detail in the following, were used to match focal plane positions in the prescan and postscan stacks, identify and register focused images, and perform adjustments to account for chip tilt to, ultimately, produce a final particle image. The final particle image was then analyzed 510. As shown in 510, analysis may include generation of a heatmap, which is indicative of the number of particles (e.g., EVs) immobilized on a printed spot. Analysis can further include determinations of the size, shape, and type of the particles.

3D Image Registration Process

The sensor chips used in this example comprised multiple fiducial reference markers on their surfaces, as shown, for example, in FIG. 6C, FIGS. 7A and 7B, and FIG. 9A. The presence of the reference markers in images of the prescan stack and the postscan stack was used in combination with a series of image processing steps to perform a registered subtraction and obtain final particle images in which background noise (e.g., fluctuations) due to, among other things, sensor chip surface roughness, was subtracted out and minimized, allowing for improved particle detection.

Figure 5B:
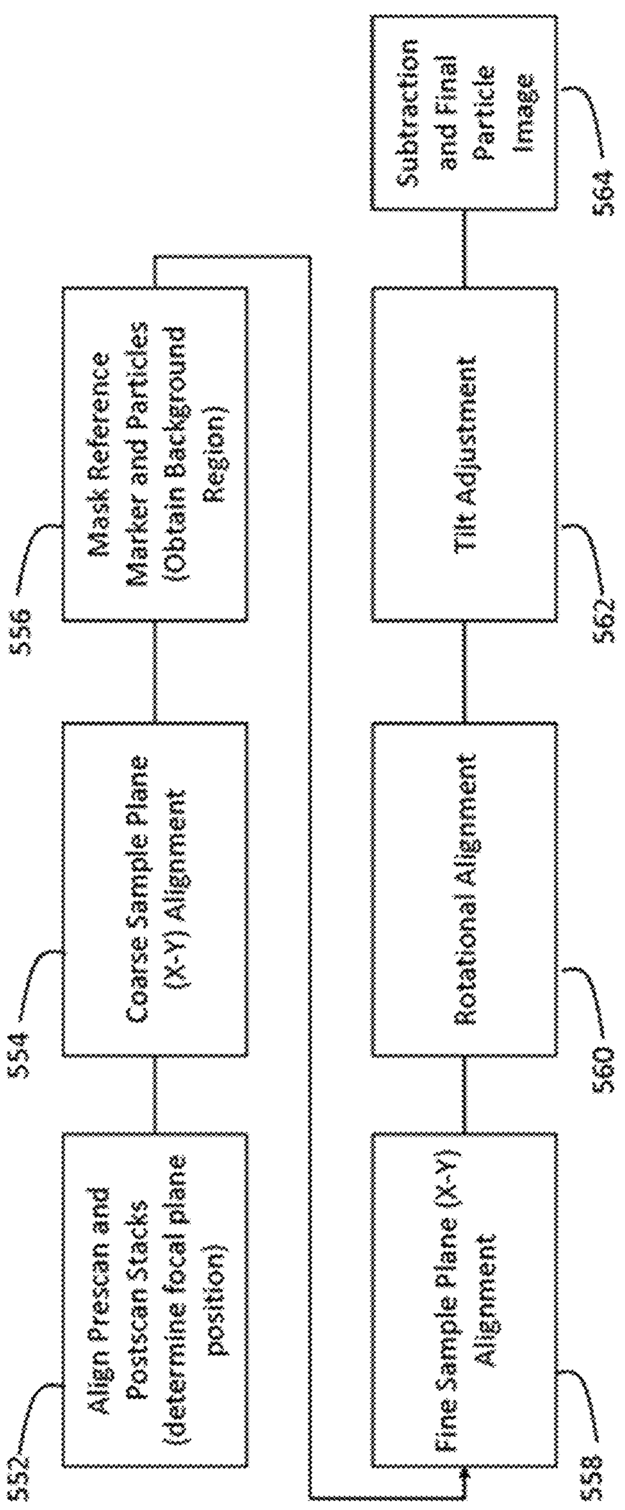
FIG. 5B is a flow diagram illustrating the registration process of FIG. 5A.

FIG. 5B shows a flow diagram illustrating the registered image subtraction performed in this example, in accordance with certain embodiments described herein.

1. Align Z-Stacks Using a DoG Curve on a Reference Region.

In a first step 552, the prescan and postscan stacks were aligned. In particular, each image (e.g., slice) the image stacks is acquired at a different axial distance from the microscope objective. For convenience, in this example, the X-Y plane in 3-dimensional (3D) space is considered to be aligned with the surface of the senor chip, while movement perpendicular to the plane is considered to be movement along the "Z-axis". To acquire image stacks, an image in the stack (e.g., a slice) is taken at a first axial location, along the Z-axis, and then the imaging device is adjusted (e.g., mechanically) to a second position to acquire a second image at a second focal plane (e.g., a second slice). The adjustment is made such that each image of the stack (e.g., slice) is representative of a different position along the Z-axis. The process can be repeated as many times as necessary to generate a series of images (e.g., a plurality of slices) along the Z-axis, thus generating a Z-stack of images. In certain embodiments, the distance between neighboring focal planes is substantially uniform.

In order to account for small offsets between absolute z-positions of the sensor chip before and after incubation, prescan image stacks and postscan image stacks are aligned to determine a prescan focal plane position corresponding to a particular slice number within the prescan stack and a postscan focal plane position corresponding to a particular slice number within the postscan stack.

In particular, in this example processing approach, a reference region surrounding a particular fiducial marker image within the prescan stack was identified, and, for each image of the prescan stack, a difference of Gaussian (DoG) score was computed using the reference region. This was repeated, similarly, for the postscan image stack. FIG. 6A and FIG. 6B show two exemplary DoG focus curves from prescan and postscan image stacks acquired from reference spots on a region of a substrate (e.g., FIG. 6C). FIG. 6C is an exemplary image of a reference spot on a substrate where the bright, reverse "L" shaped region is a reference spot. In certain embodiments, the images of the Z-stacks are non-saturated images (e.g., 25% full-well exposure). In certain embodiments, there are few particles on edges of the reference spot (e.g., on the outline of the reverse "L" shape shown in FIG. 6C).

The DoG focus curves were used to identify a particular slice of the prescan stack as the focused prescan image and a particular slice of the postscan stack as the focused postscan image.

2. Coarse Local Alignment of Reference Region

After alignment of the Z-stack images, a coarse local alignment of the reference region on the surface of the chip was performed using the focused prescan image and the focused postscan image 554. FIG. 7A is an exemplary image of a reference region where prescan and postscan images of the same focal plane have been subtracted without alignment in the X-Y plane. After the coarse X-Y offset is found, for example by identifying locations of reference fiducials, the X-Y shift can be applied to the images prior to subtraction to coarsely align the images. FIG. 7B is an exemplary image of the same reference spot as FIG. 7A where prescan and postscan images have been coarsely aligned using the determined X-Y offset prior to subtraction. Both the particles and the reference markers shown in FIG. 7B have clear, well-delineated edges (e.g., as opposed to the positive and negative contrast edges shown in the un-aligned image of FIG. 7A).

3. Mask Particles on Reference Region.

Figure 8:
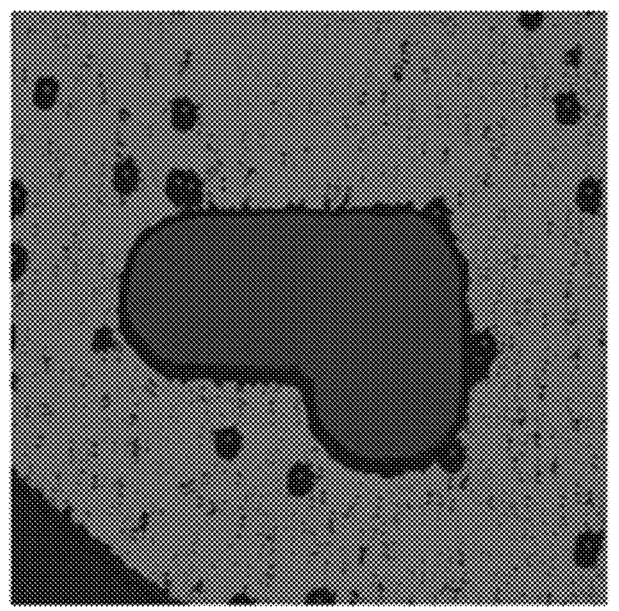
FIG. 8 is an exemplary image of a reference spot and particles to which a mask has been applied.

In the next step, 556 a mask is applied to particles, reference regions, and other features of found in the image of the prescan and postscan images. FIG. 8 is an exemplary image of a reference spot and particles to which a mask has been applied. The mask can be used to determine a small background region that excludes particles, reference markers, and other small features on the sensor chip surface, leaving a small background region of the image that represents background roughness—i.e., such that intensity fluctuations in the background region are due (e.g., solely) to surface roughness. The background region may be located within, or outside, a spot (of capture molecules) on the chip. Matching background regions are identified in the (following coarse registration) focused prescan image and focused postscan image.

4. Fine X-Y Alignment of Local Neighborhood.

Figure 9A:
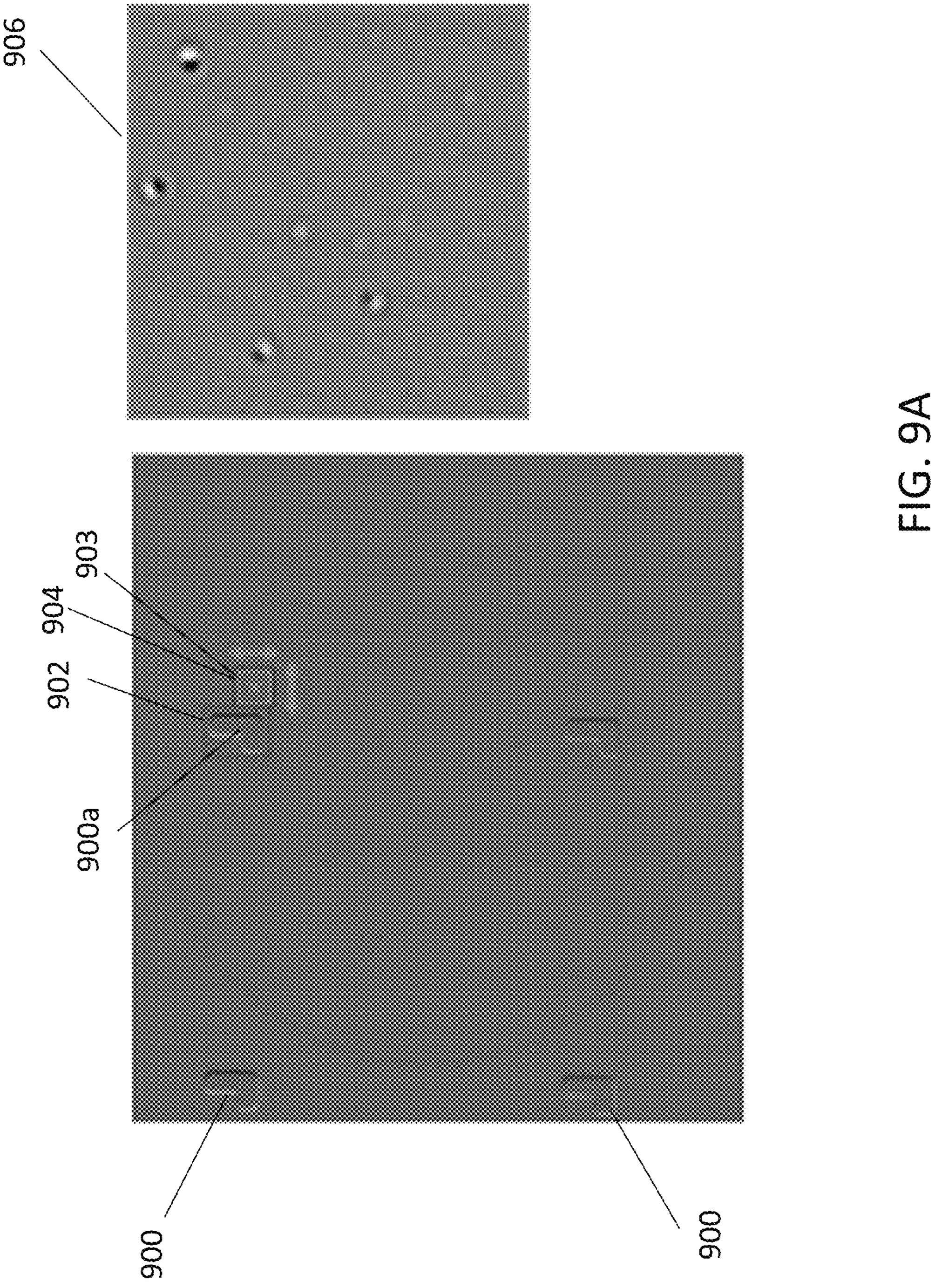
FIG. 9A depicts an exemplary image of a chip including alignment markers as reversed "L"s.
Figure 9B:
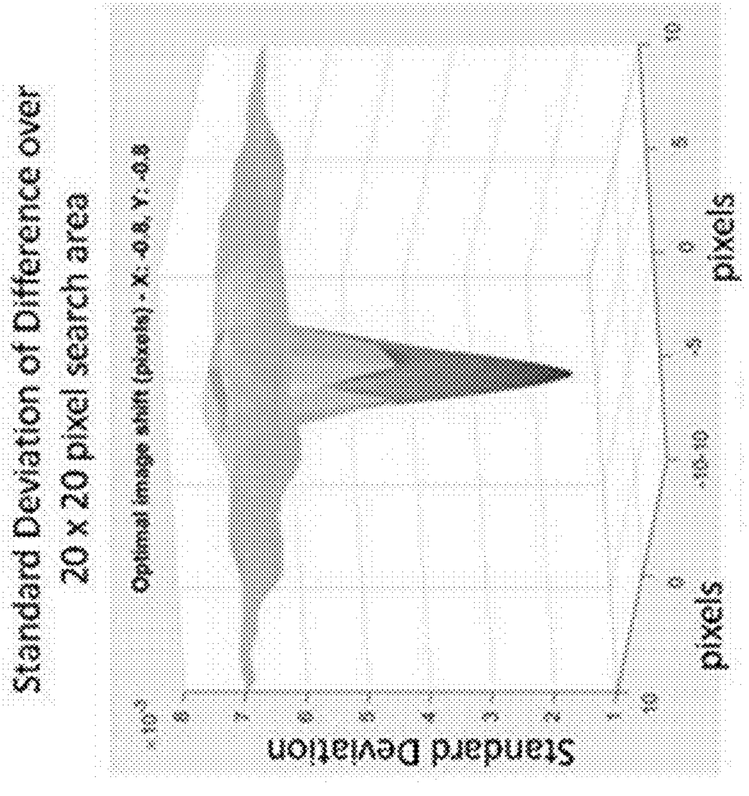
FIG. 9B shows the standard deviation of the difference between two exemplary images over a 20×20 pixel search area.

In a next step, to perform a fine alignment in the x-y plane 558, the background regions of the prescan and postscan images are repeatedly subtracted from each other as small relative shifts in the x-y plane are applied, as illustrated in FIGS. 9A and 9B, to search a local neighborhood. FIG. 9A is an image of a chip with alignment markers 900 (as reversed "L"s) shown on it. One of the alignment markers **900*a* is within the boundaries of a red box 902. The green and blue inset boxes 903, 904, are representative of a small background region. In certain embodiments, a portion of a prescan image without a reference spot (906, as shown in green) can be scanned over a small area of the corresponding postscan image (e.g., denoted by the blue box 904 in FIG. 9A). This allows for optimal alignment between the two images. FIG. 9**B shows the standard deviation of the difference between two images over a 20×20 pixel search area (i.e., as each image is shifted relative to each other by 0 to 20 pixels in the x and y directions). If two images are perfectly aligned with no difference between them, the standard deviation of the difference is expected to be minimized. Accordingly, the minimum value shown on the 3D plot corresponds to the optimal shift that should be applied in order to align the two images.

5. Rotational Alignment on Large Image.

Figure 10A:
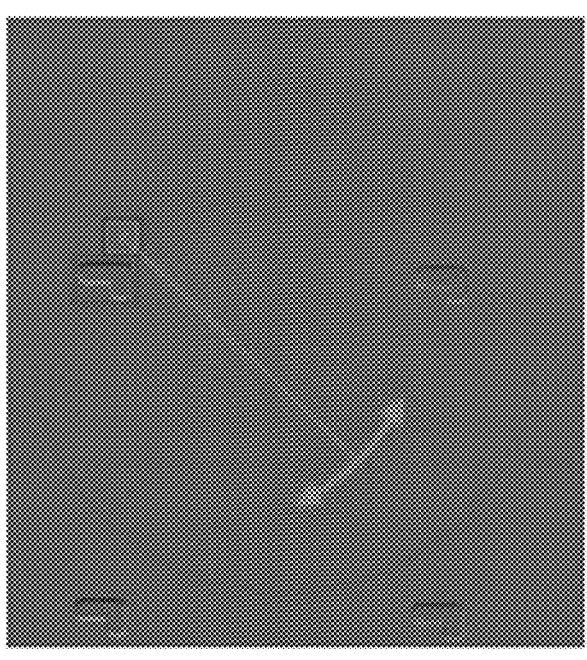

After local alignment has been achieved, a rotational alignment of the two images is performed 560. The rotational alignment of the two images is conducted over a larger area of the images than the fine X-Y alignment. FIGS. 10A and 10B show a process for rotational alignment between prescan and postscan images. The center of the rotation is placed at center of the previously aligned reference region used in performing the fine X-Y alignment. FIG. 10B is a graph of the standard deviation of the difference between the two images as one image is rotated over the other image. As larger images are rotated over one another, the optimal alignment between the two images corresponds to the minimum standard deviation of the difference between the images, which is about 0.002 radians in the present example. Accordingly, the rotation can be applied to the images in order to achieve a better alignment between them.

6. Chip Out-of-Plane Tilt Search.

After rotation, an out-of-plane tilt search can be conducted in order to determine an optimal slice for image subtraction 562. As discussed herein, each slice of a prescan or postscan image stack corresponds to a different axial plane along the Z-axis at which the imaging device acquired an image. In certain embodiments, the optimal slice for image subtraction may be determined by taking an image from one stack (e.g., a prescan stack) and dividing it into four substantially equal square quadrants. For example, for a square or rectangular image, this may correspond to a top left (TL), top right (TR), bottom left (BL), bottom right (BR) quadrant. Then, the slice is compared to a corresponding region of images of a second stack (e.g., a postscan stack) in order to minimize the difference between the images. The standard deviation of the difference between the images should decrease with better alignment between the slices. FIG. 11 is an example plot showing optimization of four quadrants, TL 1100, TR 1102, BL 1104, and BR 1106, of a prescan image as it is scanned along the corresponding quadrants in images of the postscan stack.

Results

After performing registration as described herein, an optimal pair of registered and focused prescan and postscan images were obtained and subtracted from each other to obtain a final particle image. Standard deviation of the background was computed to evaluate performance of the approach in minimizing background fluctuations. Table 1 below compares the approach of the present example, which uses fiducial markers and background intensity fluctuations with a bead-based approach.

TABLE 1

| Bead based method vs. Beadless | | | |
|---|---|---|---|
| | Background σ 32 frame avg | Background σ 256 frame avg | Processing Time/Spot (s) |
| Bead Method | 0.36 | 0.22 | 7 |
| Beadless | 0.36 | 0.20 | 14 |

The results show that the beadless method that the background standard deviation using a 32 frame average is comparable between the two methods. However, increasing the number of averaged frames to 256 shows a small decrease in standard deviation in the beadless method as compared to a bead based method. The time it takes to perform the beadless method is greater than the bead based method. It takes about 7 seconds per spot to process an image using a bead based method as compared to the beadless method, which takes about 14 seconds per spot to process an image. However, further optimization can be achieved to reduce processing time for the beadless method.

The particles that may be detected by the imaging methods described herein include, but are not limited to, extracellular vesicles, exosomes, viruses, virus-like particles, or lipid nanoparticles. Detection of the particles in the images may be used to classify, diagnose, and/or monitor a disease (e.g., involving a tumor, cancer, malignancy) in a patient, or select a treatment option for the patient. In some embodiments, the method may include the step of treating the patient.

In one embodiment, the detection of particles by the imaging methods described herein may be used to classify, diagnose, and/or monitor a tumor or cancer. In some embodiments, the cancer is an adenocarcinoma. In some embodiments, the cancer is selected from breast, lung, head or neck, prostate, esophageal, tracheal, brain, liver, bladder, stomach, pancreatic, ovarian, uterine, cervical, testicular, colon, rectal, and skin. In some embodiments the caner is an adenocarcinoma of the breast, lung, head or neck, prostate, esophagus, trachea, brain, liver, bladder, stomach, pancreas, ovary, uterus cervix, testicular, colon, rectum, or skin. In some embodiments the cancer is selected from pancreatic, lung (e.g., small cell or non-small cell), and breast.

Other examples of tumors, cancers, or malignancies include, but are not limited to, Acute Childhood Lymphoblastic Leukemia, Acute Lymphoblastic Leukemia, Acute Lymphocytic Leukemia, Acute Myeloid Leukemia, Adrenocortical Carcinoma, Adult (Primary) Hepatocellular Cancer, Adult (Primary) Liver Cancer, Adult Acute Lymphocytic Leukemia, Adult Acute Myeloid Leukemia, Adult Hodgkin's Disease, Adult Hodgkin's Lymphoma, Adult Lymphocytic Leukemia, Adult Non-Hodgkin's Lymphoma, Adult Primary Liver Cancer, Adult Soft Tissue Sarcoma, AIDS-Related Lymphoma, AIDS-Related Malignancies, Anal Cancer, Astrocytoma, Bile Duct Cancer, Bladder Cancer, Bone Cancer, Brain Stem Glioma, Brain Tumors, Breast Cancer, Cancer of the Renal Pelvis and Ureter, Central Nervous System (Primary) Lymphoma, Central Nervous System Lymphoma, Cerebellar Astrocytoma, Cerebral Astrocytoma, Cervical Cancer, Childhood (Primary) Hepatocellular Cancer, Childhood (Primary) Liver Cancer, Childhood Acute Lymphoblastic Leukemia, Childhood Acute Myeloid Leukemia, Childhood Brain Stem Glioma, Childhood Cerebellar Astrocytoma, Childhood Cerebral Astrocytoma, Childhood Extracranial Germ Cell Tumors, Childhood Hodgkin's Disease, Childhood Hodgkin's Lymphoma, Childhood Hypothalamic and Visual Pathway Glioma, Childhood Lymphoblastic Leukemia, Childhood Medulloblastoma, Childhood Non-Hodgkin's Lymphoma, Childhood Pineal and Supratentorial Primitive Neuroectodermal Tumors, Childhood Primary Liver Cancer, Childhood Rhabdomyosarcoma, Childhood Soft Tissue Sarcoma, Childhood Visual Pathway and Hypothalamic Glioma, Chronic Lymphocytic Leukemia, Chronic Myelogenous Leukemia, Colon Cancer, Cutaneous T-Cell Lymphoma, Endocrine Pancreas Islet Cell Carcinoma, Endometrial Cancer, Ependymoma, Epithelial Cancer, Esophageal Cancer, Ewing's Sarcoma and Related Tumors, Exocrine Pancreatic Cancer, Extracranial Germ Cell Tumor, Extragonadal Germ Cell Tumor, Extrahepatic Bile Duct Cancer, Eye Cancer, Female Breast Cancer, Gaucher's Disease, Gallbladder Cancer, Gastric Cancer, Gastrointestinal Carcinoid Tumor, Gastrointestinal Tumors, Germ Cell Tumors, Gestational Trophoblastic Tumor, Hairy Cell Leukemia, Head and Neck Cancer, Hepatocellular Cancer, Hodgkin's Disease, Hodgkin's Lymphoma, Hypergammaglobulinemia, Hypopharyngeal Cancer, Intestinal Cancers, Intraocular Melanoma, Islet Cell Carcinoma, Islet Cell Pancreatic Cancer, Kaposi's Sarcoma, Kidney Cancer, Laryngeal Cancer, Lip and Oral Cavity Cancer, Liver Cancer, Lung Cancer, Lymphoproliferative Disorders, Macroglobulinemia, Male Breast Cancer, Malignant Mesothelioma, Malignant Thymoma, Medulloblastoma, Melanoma, Mesothelioma, Metastatic Occult Primary Squamous Neck Cancer, Metastatic Primary Squamous Neck Cancer, Metastatic Squamous Neck Cancer, Multiple Myeloma, Multiple Myeloma/Plasma Cell Neoplasm, Myelodysplastic Syndrome, Myelogenous Leukemia, Myeloid Leukemia, Myeloproliferative Disorders, Nasal Cavity and Paranasal Sinus Cancer, Nasopharyngeal Cancer, Neuroblastoma, Non-Hodgkin's Lymphoma During Pregnancy, Nonmelanoma Skin Cancer, Non-Small Cell Lung Cancer, Occult Primary Metastatic Squamous Neck Cancer, Oropharyngeal Cancer, Osteo-/Malignant Fibrous Sarcoma, Osteosarcoma/Malignant Fibrous Histiocytoma, Osteosarcoma/Malignant Fibrous Histiocytoma of Bone, Ovarian Epithelial Cancer, Ovarian Germ Cell Tumor, Ovarian Low Malignant Potential Tumor, Pancreatic Cancer, Paraproteinemias, Purpura, Parathyroid Cancer, Penile Cancer, Pheochromocytoma, Pituitary Tumor, Plasma Cell Neoplasm/Multiple Myeloma, Primary Central Nervous System Lymphoma, Primary Liver Cancer, Prostate Cancer, Rectal Cancer, Renal Cell Cancer, Renal Pelvis and Ureter Cancer, Retinoblastoma, Rhabdomyosarcoma, Salivary Gland Cancer, Sarcoidosis Sarcomas, Sezary Syndrome, Skin Cancer, Small Cell Lung Cancer, Small Intestine Cancer, Soft Tissue Sarcoma, Squamous Neck Cancer, Stomach Cancer, Supratentorial Primitive Neuroectodermal and Pineal Tumors, T-Cell Lymphoma, Testicular Cancer, Thymoma, Thyroid Cancer, Transitional Cell Cancer of the Renal Pelvis and Ureter, Transitional Renal Pelvis and Ureter Cancer, Trophoblastic Tumors, Ureter and Renal Pelvis Cell Cancer, Urethral Cancer, Uterine Cancer, Uterine Sarcoma, Vaginal Cancer, Visual Pathway and Hypothalamic Glioma, Vulvar Cancer, Waldenstrom's Macroglobulinemia, Wilms' Tumor, and any other hyperproliferative disease, besides neoplasia, located in an organ system listed above.

Elements of different implementations described herein may be combined to form other implementations not specifically set forth above. Elements may be left out of the processes, computer programs, databases, etc. Described herein without adversely affecting their operation. In addition, the logic flows depicted in the figures do not require the particular order shown, or sequential order, to achieve desirable results. Various separate elements may be combined into one or more individual elements to perform the functions described herein.

Throughout the description, where apparatus and systems are described as having, including, or comprising specific components, or where processes and methods are described as having, including, or comprising specific steps, it is contemplated that, additionally, there are apparatus, and systems of the described technology that consist essentially of, or consist of, the recited components, and that there are processes and methods according to the described technology that consist essentially of, or consist of, the recited processing steps.

It should be understood that the order of steps or order for performing certain action is immaterial so long as the described technology remains operable. Moreover, two or more steps or actions may be conducted simultaneously.

While the described technology has been particularly shown and described with reference to specific embodiments, it should be understood by those skilled in the art that various changes in form and detail may be made therein without departing from the spirit and scope of the described technology as defined by the appended claims.

The invention claimed is:

1. A method for reducing background in an interferometric image via a three-dimensional (3D) image registration and background correction, the method comprising:

(a) receiving, by a processor of a computing device, a prescan stack comprising a plurality of images of a first region of a sensor chip surface, the images of the prescan stack having been obtained prior to contacting the sensor chip surface with a sample comprising one or more target particles, and each image of the prescan stack corresponding to an image of the first region of the sensor chip surface taken at a different axial distance from an objective of an imaging system;

(b) receiving, by the processor, a postscan stack comprising a plurality of images of a second region of the sensor chip surface (e.g., the second region substantially overlapping with the first region), the images of the postscan stack having been obtained after contacting the sensor chip surface with the sample, and each image of the postscan stack corresponding to an image of the second region of the sensor chip surface taken at a different axial distance from the objective of the imaging system;

(c) determining, by the processor, a prescan focal plane position for the prescan stack and using the prescan focal plane position to obtain, from the prescan stack, a focused prescan image;

(d) determining, by the processor, a postscan focal plane position for the postscan stack and using the postscan focal plane position to obtain, from the postscan stack, a focused postscan image;

(e) registering, by the processor, the focused prescan image with the focused postscan image; and (f) following step (e), using, by the processor, the focused prescan image and focused postscan image, having been registered with each other, to create one or more final particle image(s) a reduced background.

2. The method of claim 1, wherein the first region of the sensor chip surface imaged in the prescan stack comprises a plurality of reference particles such that each of at least a portion of the prescan images of the prescan stack comprise one or more reference particle features.

3. The method of claim 2, wherein step (c) comprises:

detecting, within each of at least a portion of the images of the prescan stack, a set of one or more reference particle features corresponding to an individual reference particle; and using the sets of reference particle features within the images of the prescan stack to determine the prescan focal plane position.

4. The method of claim 3, comprising:

(A) determining, for each of at least a portion of images of the prescan stack, one or more focal metrics using the detected set of detected reference particle features for the image, wherein determining the one or more focal metrics comprises one or more of:

(i) determining a number of reference particle features within each of the portion of prescan images;

(ii) determining a measure of reference particle contrast for each of the portion of prescan images; and (iii) determining a measure of reference particle size for each of the portion of prescan images; and (B) using the one or more focal metrics to determine the prescan focal plane position.

5. The method of claim 2, wherein the second region of the sensor chip surface imaged in the postscan stack comprises a plurality of reference particles such that each of at least a portion of the images of the postscan stack comprise one or more reference particle features.

6. The method of claim 5, wherein step (d) comprises:

detecting, within each of at least a portion of the images of the postscan stack, a set of one or more reference particle features corresponding to an individual reference particle; and using the sets of reference particle features within the images of the postscan stack to determine the postscan focal plane position.

7. The method of claim 6, comprising:

(A) determining, for each of at least a portion of images of the postscan stack, one or more focal metrics using the detected set of detected reference particle features for the image, wherein determining the one or more focal metrics comprises one or more of:

(i) determining a number of reference particle features within each of the portion of prescan images;

(ii) determining a measure of reference particle contrast for each of the portion of prescan images; and (iii) determining a measure of reference particle size for each of the portion of prescan images; and (B) using the one or more focal metrics to determine the postscan focal plane position.

8. The method of claim 2, wherein the reference particles comprise one or more members selected from the group consisting of polystyrene beads, silica beads, latex beads, and polystyrene sulfate beads.

9. The method of claim 2, wherein at least one of the first and second regions of the sensor chip surface comprise a spot, the spot comprising one or more target binding agents that bind to the target particles, and wherein the reference particles comprise one or more molecules at their surface to which the one or more target binding agents of the spot also bind.

10. The method of claim 9, wherein the spot also comprises one or more reference binding agents that bind to the reference particles.

11. The method of claim 2, where step (e) comprises using a set of detected reference particle features within the focused prescan image and a set of detected reference particle features within the focused postscan image to register the focused prescan image and the focused postscan image with each other.

12. The method of claim 1, wherein step (e) comprises using an affine transformation to register the focused prescan image with the focused postscan image.

13. The method of claim 1, wherein step (c) comprises determining a measure of background intensity variation for each of at least a portion of the images of the prescan stack and using the measure of background intensity variation to determine the prescan focal plane position.

14. The method of claim 1, wherein step (d) comprises determining a measure of background intensity variation for each of at least a portion of the images of the postscan stack and using the measure of background intensity variation to determine the postscan focal plane position.

15. The method of claim 1, wherein step (f) comprises subtracting the focused prescan image from the focused postscan image.

16. The method of claim 1, further comprising detecting, by the processor, within at least a portion of the one or more final particle images, one or more target particle features, each corresponding to an individual target particle and using the detected one or more target particles to enumerate and/or characterize a number of individual target particles bound to the sensor chip surface.

17. The method of claim 1, further comprising receiving, by the processor, a fluorescence image of a third region of the sensor chip surface, the third region substantially overlapping with the second region, and using the fluorescence image and at least a portion of the one or more final particle images to quantify or characterize a population of target particles comprising a particular biomarker.

18. The method of claim 1, wherein the one or more target particles comprises an extracellular vesicle.

19. The method of claim 1, wherein the one or more target particles comprises a virus or a virus-like particle.

20. The method of claim 19, wherein the virus is lentivirus or adeno-associated virus (AAV).

21. The method of claim 1, wherein the one or more target particles comprises a lipid nanoparticle.

22. The method of claim 1, wherein the sensor chip surface is a top surface of a thin partially transparent layer on a base substrate.

23. A system comprising:

a processor of a computing device; and a memory having instructions stored thereon, wherein the instructions, when executed by the processor, cause the processor to perform the method of claim 1.

* * * * *